(12) United States Patent
Compton et al.

(10) Patent No.: US 11,513,704 B1
(45) Date of Patent: Nov. 29, 2022

(54) SELECTIVELY EVICTING DATA FROM INTERNAL MEMORY DURING RECORD PROCESSING

(71) Applicant: International Business Machines Corporation, Armonk, NY (US)

(72) Inventors: Scott B. Compton, Hyde Park, NY (US); Jeffrey Richard Suarez, Tucson, AZ (US); Matthew Michael Garcia Pardini, Natick, MA (US); Christian Jacobi, West Park, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/403,630

(22) Filed: Aug. 16, 2021

(51) Int. Cl.
  *G06F 3/06* (2006.01)
  *G06F 11/30* (2006.01)
  *G06F 11/34* (2006.01)

(52) U.S. Cl.
  CPC .......... *G06F 3/0631* (2013.01); *G06F 3/0604* (2013.01); *G06F 3/067* (2013.01); *G06F 3/0659* (2013.01); *G06F 11/3037* (2013.01); *G06F 11/3409* (2013.01)

(58) Field of Classification Search
  None
  See application file for complete search history.

(56) References Cited

U.S. PATENT DOCUMENTS

| | | | |
|---|---|---|---|
| 7,237,242 B2 | 6/2007 | Blythe et al. | |
| 2004/0139434 A1 | 7/2004 | Blythe et al. | |
| 2012/0284317 A1 | 11/2012 | Dalton | |
| 2016/0292255 A1 | 10/2016 | Ogasawara et al. | |
| 2017/0063992 A1* | 3/2017 | Baek | G06F 9/5083 |

FOREIGN PATENT DOCUMENTS

| | | | |
|---|---|---|---|
| CN | 104142958 A | 11/2014 | |
| CN | 111399777 A | 7/2020 | |

OTHER PUBLICATIONS

Compton et al., U.S. Appl. No. 17/403,617, filed Aug. 16, 2021.
IBM, List of IBM Patents or Patent Applications Treated as Related, dated Aug. 20, 2021, 2 pages.

(Continued)

*Primary Examiner* — Brian R Peugh
(74) *Attorney, Agent, or Firm* — Zilka-Kotab, P.C.

(57) ABSTRACT

A computer-implemented method, according to one embodiment, includes: processing records by, for each of the records: shearing the key associated with the record from the payload data, normalizing the sheared key, and storing the normalized sheared key in a first target area of memory. A determination is made whether a size of the payload data is outside a first predetermined range. In response to determining that the size of the payload data is outside the first predetermined range, the payload data is stored in a second target area of memory, and a data locator is appended to the normalized sheared key. Furthermore, in response to determining that a storage capacity of the memory is outside a second predetermined range, some of the payload data is transferred to external physical storage. Moreover, an external list is integrated with each of the data locators that correspond to the transferred payload data.

20 Claims, 16 Drawing Sheets

(56) References Cited

OTHER PUBLICATIONS

Compton et al., U.S. Appl. No. 17/443,782, filed Jul. 27, 2021.
Krikellas et al., "Multithreaded query execution on multicore processors," 35th International Conference on Very Large Data Bases VLDB, Aug. 2009, 13 pages.
Sohn et al., "Load Balanced Parallel Radix Sort," Proceedings of the 12th International Conference on Supercomputing, 1998, pp. 305-312.
Anonymous, "NIST Cloud Computing Program," NIST, Information Technology Laboratory, Nov. 13, 2013, pp. 1-2, retrieved from www.nist.gov/itl/cloud/.
Mell et al., "The NIST Definition of Cloud Computing," Version 15, Oct. 7, 2009, pp. 1-2.
Mell et al., "The NIST Definition of Cloud Computing," Recommendations of the National Institute of Standards and Technology, NIST Special Publication 800-145, Sep. 2011, pp. 1-7.
CSRC, "Cloud Computing," Computer Security Resource Center, Oct. 2017, 3 pages, retrieved from https://csrc.nist.gov/projects/cloud-computing.
Non-Final Office Action from U.S. Appl. No. 17/403,617, dated Jul. 21, 2022.

\* cited by examiner

_US 11,513,704 B1_

SELECTIVELY EVICTING DATA FROM INTERNAL MEMORY DURING RECORD PROCESSING

BACKGROUND

The present invention relates to data processing, and more specifically, this invention relates to improving performance by selectively evicting data from internal system memory during high memory strain situations.

Data sorting generally includes processes that involve arranging the data into some meaningful order to make it easier to understand, analyze, visualize, etc. For example, when working with research data, sorting is a common method used for visualizing data in a form that makes it easier to comprehend what the data is representing. While data sorting allows for data to generally be better understood, actually performing the sorting can be a resource intensive process. For instance, a data sorting operation may involve moving data between different storage locations and/or types of memory altogether.

As a result, conventional implementations have experienced a significant consumption of available computing bandwidth when performing such data sorting operations. This is particularly apparent in situations where higher performance storage is utilized to perform at least a portion of the data sorting. While higher performance storage (e.g., such as local cache) provides more desirable performance metrics compared to lower performance storage (e.g., such as external disk), these higher performance metrics are typically paired with lower storage capacity in view of the higher cost associated with the higher performance storage, at least in comparison to the lower performance storage. Accordingly, performance of such conventional systems has significantly been impacted by record processing operations such as data sorting.

The lower storage capacity of the higher performance storage has also led to memory constraint situations in conventional implementations. As memory becomes fuller, the overarching system experiences an increasing number of halt events, thereby significantly reducing throughput and efficiency of these conventional implementations.

SUMMARY

A computer-implemented method, according to one embodiment, includes: processing records in an input data buffer, where each of the records include a key which is appended to payload data in the respective record. Moreover, processing the records in the input data buffer includes performing the following operations on each of the records: causing the key associated with the record to be sheared from the payload data in the record, causing the sheared key to be normalized, and causing the normalized sheared key to be stored in a first target area of memory. A determination is also made as to whether a size of the payload data in the record is outside a first predetermined range. In response to determining that the size of the payload data in the record is outside the first predetermined range, the payload data is stored in a second target area of memory, and a data locator is appended to the normalized sheared key in the first target area of memory to form a sheared record. Furthermore, in response to determining that a storage capacity of the memory is outside a second predetermined range, at least some of the payload data is transferred to external physical storage. Moreover, an external list is integrated with each of the data locators that correspond to the transferred payload data. It should also be noted that the external list corresponds to a storage location of the transferred payload data in the external physical storage, and the data locator corresponds to a storage location of the payload data in the second target area of memory.

A computer program product, according to another embodiment, includes a computer readable storage medium having program instructions embodied therewith. Moreover, the program instructions are readable and/or executable by a processor to cause the processor to perform the foregoing method.

A system, according to yet another embodiment, includes: a processor, and logic that is integrated with the processor, executable by the processor, or integrated with and executable by the processor. Moreover, the logic is configured to: perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
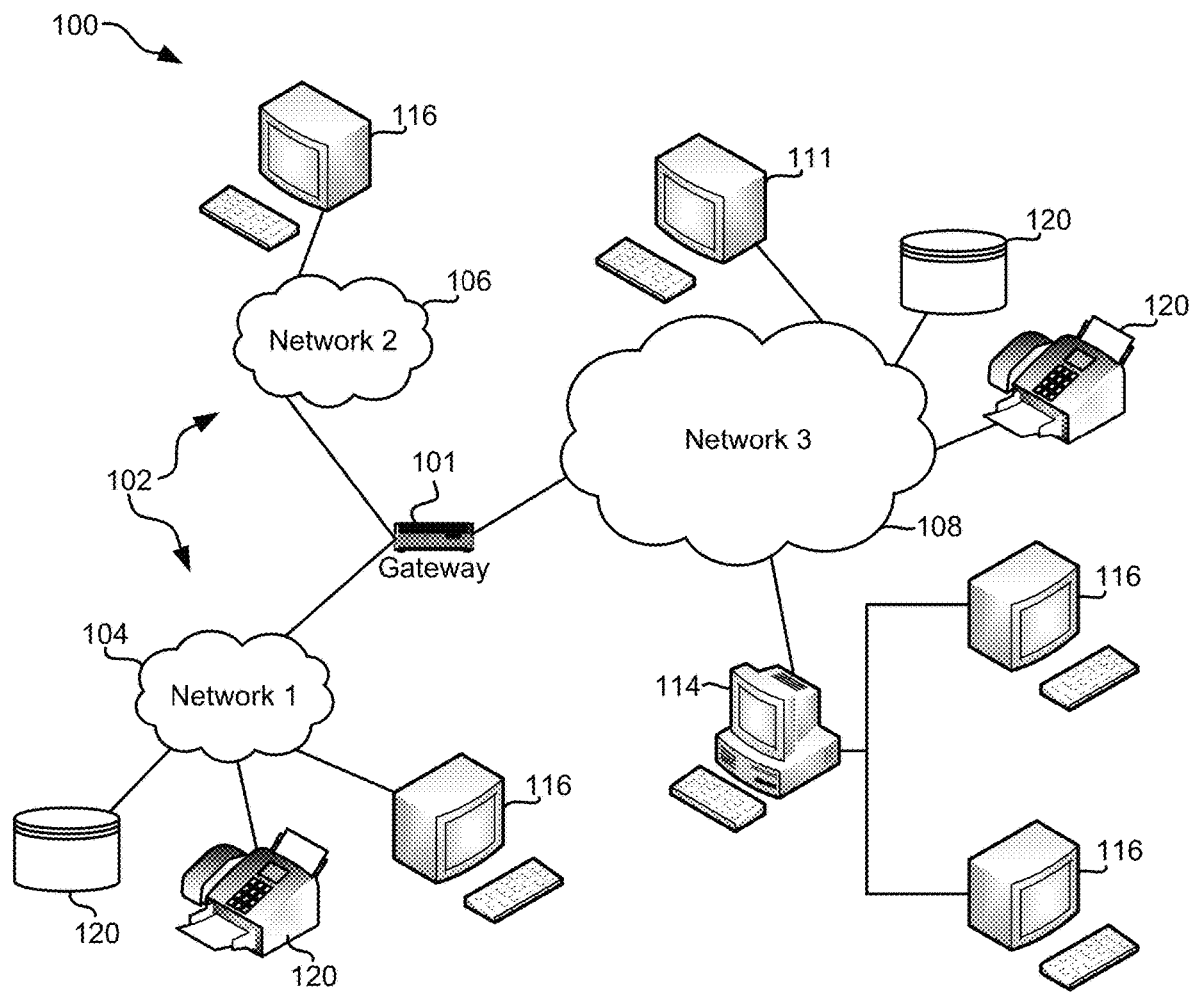
FIG. 1 is a diagram of a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for significantly reducing the computing resources that are consumed while performing record processing operations. For record processing operations such as data sorting, this reduction in resource consumption is achieved, at least in part, as a result of effectively reducing the amount of data movement within storage that is conducted in order to perform and/or as a result of performing the record processing. Moreover, by monitor the status of internal storage memory, various ones of the approaches included herein are able to further improve performance by selectively transferring data to external physical storage in situations where the internal memory is undesirably full. This effectively creates more useable space in the internal memory to maintain system throughput while also ensuring successful data retention, e.g., as will be described in further detail below.

In one general embodiment, a computer-implemented method includes: processing records in an input data buffer, where each of the records include a key which is appended to payload data in the respective record. Moreover, processing the records in the input data buffer includes performing the following operations on each of the records: causing the key associated with the record to be sheared from the payload data in the record, causing the sheared key to be normalized, and causing the normalized sheared key to be stored in a first target area of memory. A determination is also made as to whether a size of the payload data in the record is outside a first predetermined range. In response to determining that the size of the payload data in the record is outside the first predetermined range, the payload data is stored in a second target area of memory, and a data locator is appended to the normalized sheared key in the first target area of memory to form a sheared record. Furthermore, in response to determining that a storage capacity of the memory is outside a second predetermined range, at least some of the payload data is transferred to external physical storage. Moreover, an external list is integrated with each of the data locators that correspond to the transferred payload data. It should also be noted that the external list corresponds to a storage location of the transferred payload data in the external physical storage, and the data locator corresponds to a storage location of the payload data in the second target area of memory.

In another general embodiment, a computer program product includes a computer readable storage medium having program instructions embodied therewith. Moreover, the program instructions are readable and/or executable by a processor to cause the processor to perform the foregoing method.

In yet another general embodiment, a system includes: a processor, and logic that is integrated with the processor, executable by the processor, or integrated with and executable by the processor. Moreover, the logic is configured to: perform the foregoing method.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM—based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
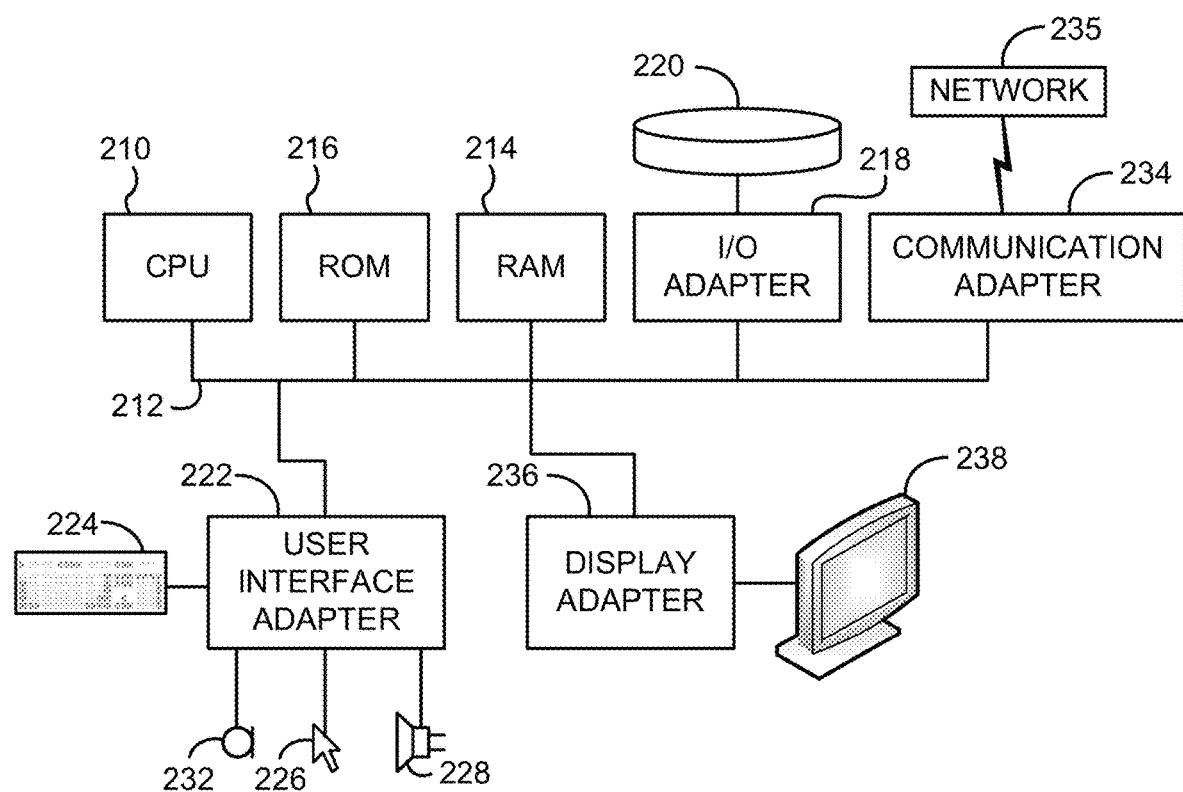
FIG. 2 is a diagram of a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
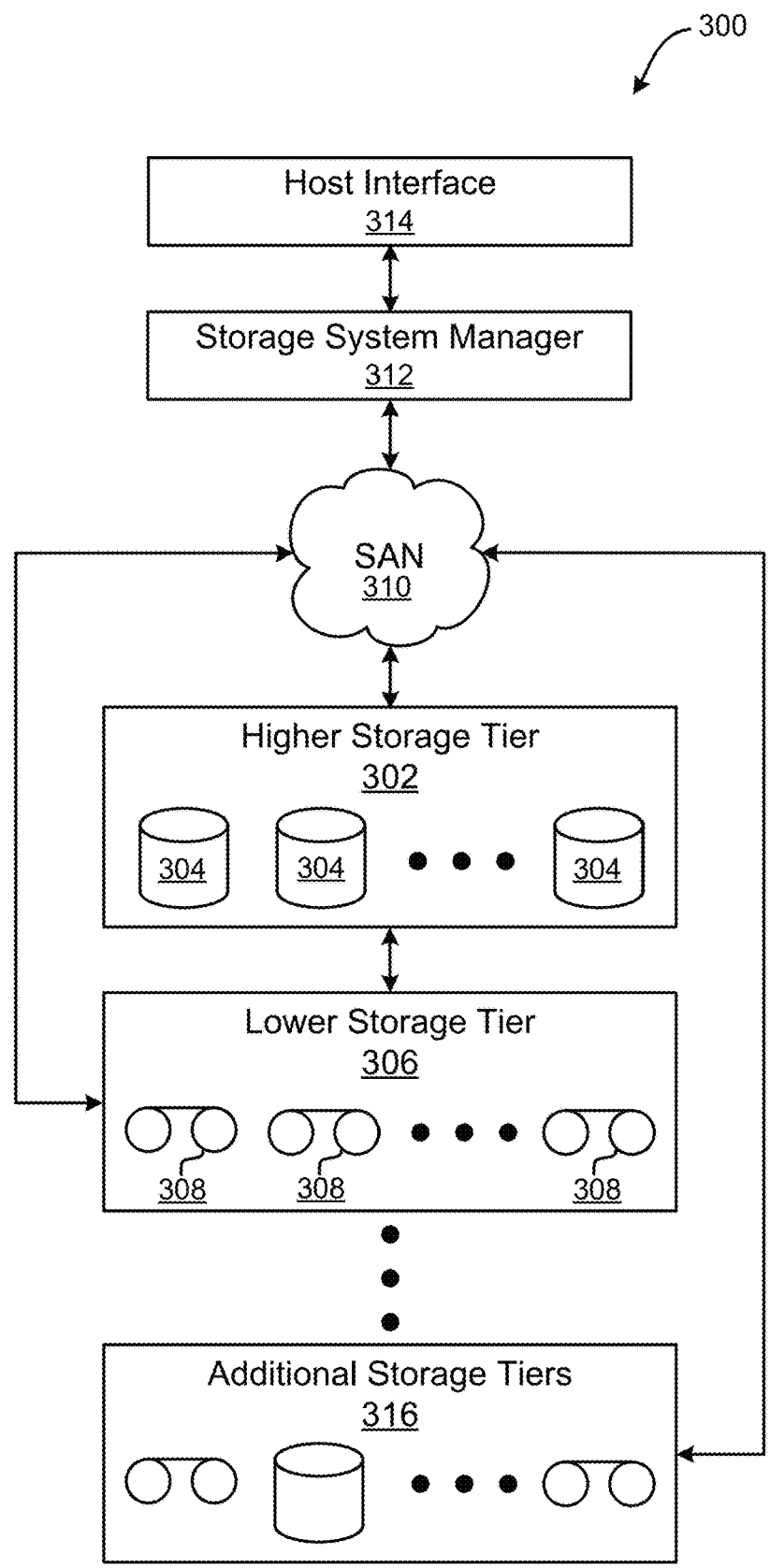
FIG. 3 is a diagram of a tiered data storage system, in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned, conventional systems have experienced a significant consumption of available computing bandwidth when performing data sorting operations. This is particularly apparent in situations where higher performance storage is utilized to perform at least a portion of the data sorting. While higher performance storage (e.g., such as local cache) provides more desirable performance metrics compared to lower performance storage (e.g., such as external disk), these higher performance metrics are typically paired with lower storage capacity in view of the higher cost associated with the higher performance storage, at least in comparison to the lower performance storage. Accordingly, performance of such conventional systems has significantly been impacted by record processing operations such as data sorting, especially for situations involving large collections of data, as these larger data sets not only negatively impact computing overhead imposed on the system, but also consumes an undesirably high percentage of the system's available internal memory.

In sharp contrast to these conventional shortcomings, various ones of the approaches included herein are able to significantly reduce the amount of computing resources that are consumed while performing record processing operations. For record processing operations such as data sorting, this reduction in resource consumption is achieved, at least in part, as a result of effectively reducing the amount of data movement within storage. For instance, by shearing a key from the payload data in a given record such that the record may effectively be processed without moving and/or analyzing the payload data itself, some of the approaches included herein are able to improve the efficiency at which the overarching system is able to operate, while also maintaining successful data operations. Furthermore, by offloading larger datasets from internal memory, some of the approaches herein are able to significantly increase throughput of the system, e.g., as will be described in further detail below.

Figure 4A:
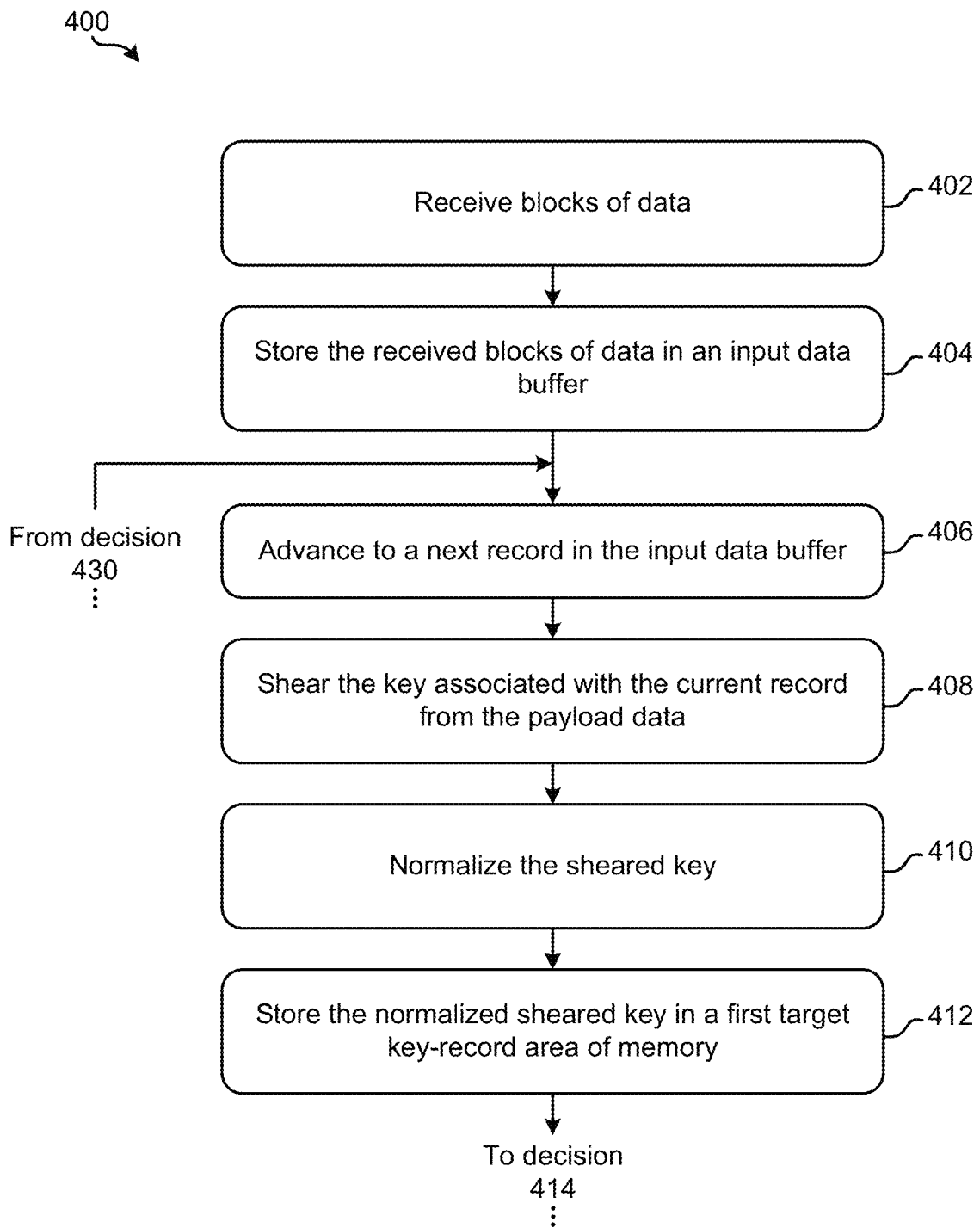
FIG. 4A is a flowchart of a method, in accordance with one embodiment.
Figure 4A:
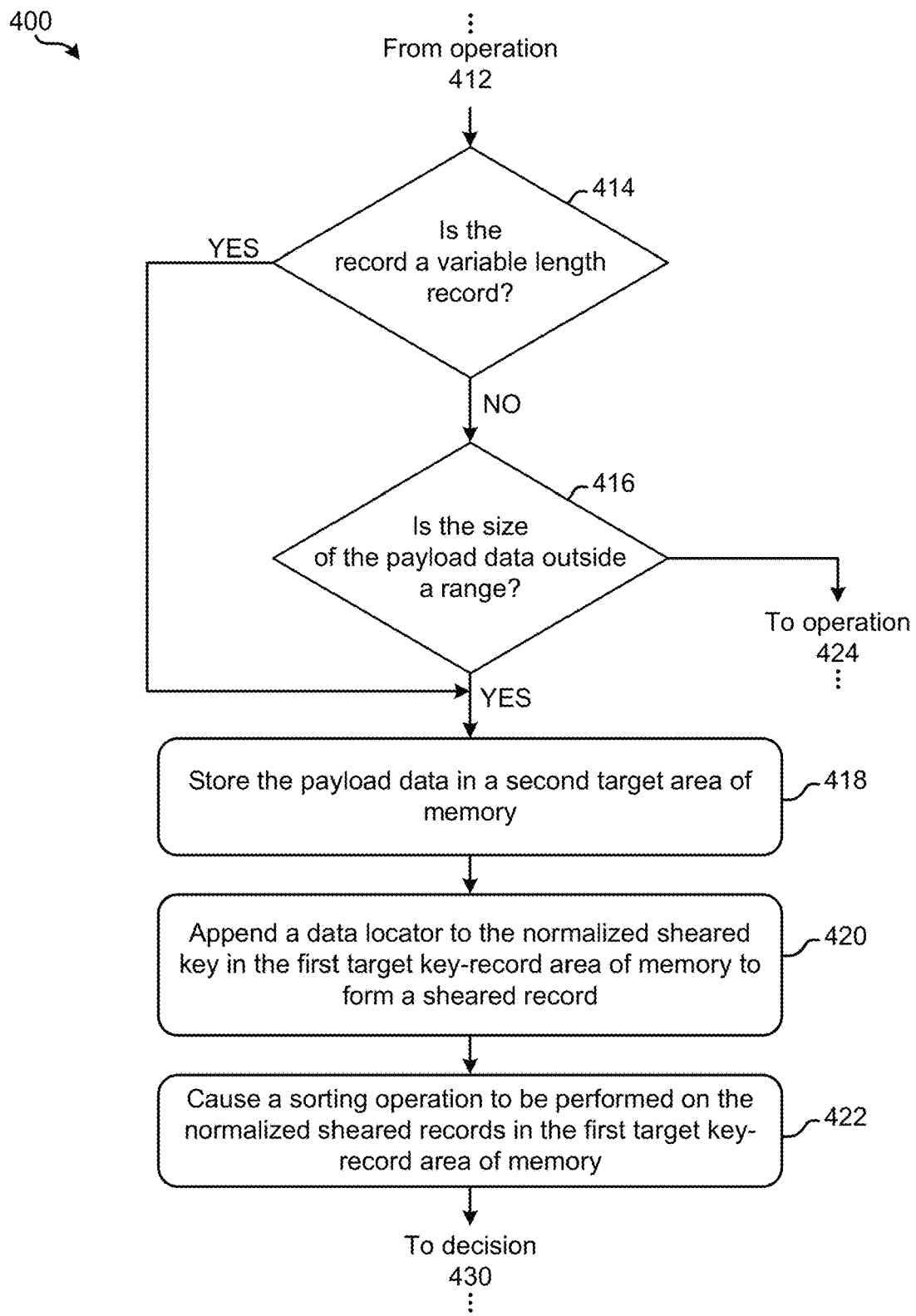
Figure 4A:
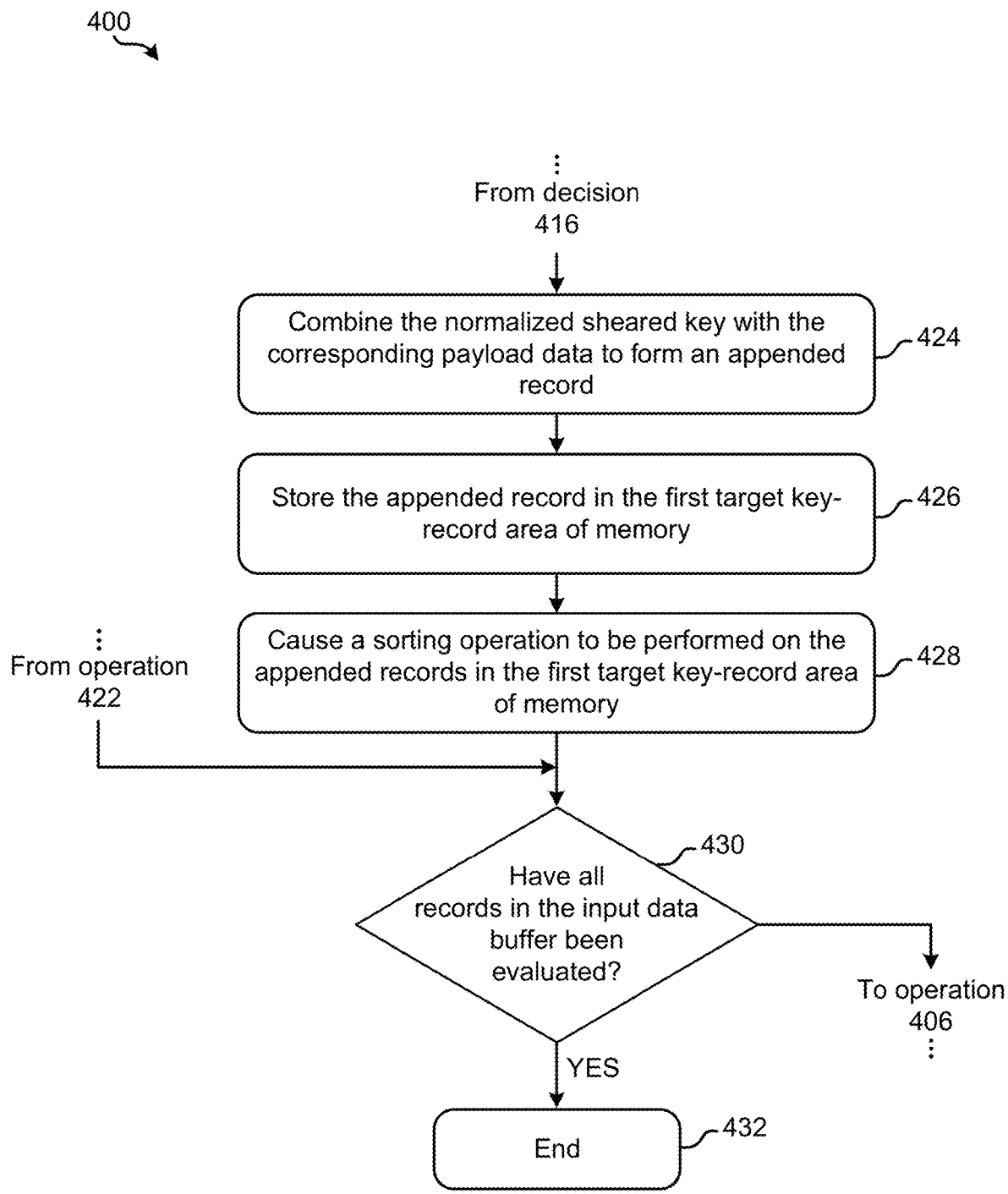

Referring now to FIG. 4A, a flowchart of a method 400 for reduce data drag when manipulating data during record processing is shown according to one embodiment. The method 400 may be performed in accordance with the present invention in any of the environments depicted in FIGS. 1-3, among others, in various embodiments. Of course, more or less operations than those specifically described in FIG. 4A may be included in method 400, as would be understood by one of skill in the art upon reading the present descriptions.

Each of the steps of the method 400 may be performed by any suitable component of the operating environment. For example, one or more of the operations included in method 400 may be performed by a central storage controller that is electrically coupled to an input buffer as well as various portions of memory. In other embodiments, the method 400 may be partially or entirely performed by a controller, a processor, a computer, etc., or some other device having one or more processors therein. Thus, in some embodiments, method 400 may be a computer-implemented method. In such embodiments, the computer used to implement the method may include the tape drive itself or a portion thereof such as the controller, the tape, an external host, a server, etc. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4A, operation 402 of method 400 includes receiving blocks of data. Each block of data is a grouping of information which includes one or more logical records and a block header therein. While the information in a block of data received in operation 402 may have different forms depending on the particular approach, FIG. 5B below depicts an illustrative block 502 having a block header 510 and various logical records 512 therein. It is also noted that the full length BlockLen of the block 502 has not been utilized, thereby leaving a portion of the block 502 unused (e.g., padded).

Referring back to FIG. 4A, the blocks of data may be received from different locations and/or sources depending on the approach. For instance, in some approaches at least some of the blocks of data may be received from an application that is being performed by the overarching system, while in other approaches at least some of the blocks of data may be received directly from a user for storage in memory. In still other approaches, at least some of the data blocks may be received from a remote storage system in response to performing a data relocation operation.

Proceeding to operation 404, method 400 further includes storing the received blocks of data (and the records included therein) in an input data buffer. The input data buffer may be of any desired type, but preferably has a large enough storage capacity to hold a number of data blocks. The blocks of data received in operation 402 may also be separated into each of the respective blocks before being stored in the input data buffer individually. It should also be noted that in preferred approaches, each of the records include a key which is appended to payload data that is in the record. It follows that the blocks are stored in a portion of memory based on how the data is actually read from the source, while key and payload data separation (e.g., shearing) is performed in certain situations.

A key may include information (e.g., metadata) which describes the payload data, e.g., such as the type of data included in the payload, an author and/or administrator of the record itself, an intended storage location for the payload data, other records which include payload data that corresponds to the payload data in the present record, etc. It follows that the key provides various information which may be used to help satisfy any data operations that may be associated with the received record. The keys may also be formatted differently depending on the approach and/or the record in which the key is included, thereby affecting the types of operations and/or systems that are able to utilize the keys. In other words, certain applications and/or operations may only support (e.g., be configured to utilize) certain types of data formats. Thus, the key again provides information which is valuable in determining whether the payload data in a given record is supported by the given application, operation, etc., without having to actually inspect the contents of the payload data itself.

From operation 404, method 400 proceeds to operation 406 which includes advancing to a next record in the input data buffer. In other words, operation 406 includes analyzing another one of the records in the input buffer. According to an example, which is in no way intended to limit the invention, a first time method 400 is performed, operation 406 may include advancing to a first record in the input data buffer, while subsequent iterations of method 400 may include advancing to a next record in the input data buffer. It follows that some of the processes included in method 400 may be repeated in order to process each of the records that are in the input data buffer, e.g., as will be described in further detail below.

It should also be noted that the "first" record and the "next" record in the input data buffer may vary depending on the particular approach. For instance, in some situations the input data buffer may be designed to operate in a first-in-first-out (FIFO) manner in which case a "first" record is the oldest record in the buffer, and each "next" record that the method 400 advances to is the next oldest record in the buffer. However, in other approaches the input data buffer may be designed to operate in a last-in-first-out (LIFO) manner in which case a "first" record is the newest record in the buffer, and each "next" record that the method 400 advances to is the next newest record in the buffer. In still other approaches, the input data buffer may advance to a next record in the buffer, where the "next" record is selected randomly, based on user input, based on a size of the entries in the buffer, etc.

FIG. 4A also includes shearing the key associated with the current record from the payload data in the given record. See operation 408. In other words, in response to advancing to a next record in the input data buffer, operation 408 includes actually shearing the key in the "next" record from the payload data that is also in the "next" record. The process of shearing the key from the payload data effectively separates the two, thereby forming two portions of the original record. The process of shearing the key from the data payload in a given record may be performed in some approaches by inspecting a beginning (e.g., header) of the record to identify the extents of the record herein. The extents of the record may thereby be used to determine the boundaries of the key may thereby be identified and used to remove the information in the key from the remainder of the record (i.e., the payload data). However, different shearing and/or record inspection processes may be implemented to perform operation 408, e.g., as would be appreciated by one skilled in the art after reading the present description. For instance, extraction code may be used to identify the key in a given record and extract the information included therein.

As mentioned above, the key may include information such as metadata which can describe the payload data. It should also be noted that the key itself is preferably smaller (e.g., includes less information) than the payload data. However, the key and/or the payload data itself may also vary in size depending on the approach. For instance, in some approaches the payload data and the key may both have predetermined sizes. According to an example, which is in no way intended to limit the invention, the key may have a fixed size of 512 bytes while the payload data has a fixed size of greater than 512 bytes (e.g., 1 megabyte). However, in other approaches the payload data and/or the key may have variable lengths. The type of information (e.g., data, metadata, etc.) included in the payload data and/or the key may also vary depending on the given approach. According to another example, which again is in no way intended to limit the invention, the current record may be a variable length logical record which includes a record descriptor word (RDW) followed by the actual payload data. In this particular example, the key may include a field describing the record in which the first 2 bytes contain the logical length of the overall logical record (e.g., including a 4 byte RDW).

From operation 408, method 400 proceeds to operation 410 which includes normalizing the sheared key. As noted above, the key and the information included therein may have different forms depending on the particular approach. In other words, the key is not always stored in a form which the overarching system and/or controller therein is able to interpret, e.g., such as a binary format. For example, depending on the given record being examined, the key included therein may be some formatted number, e.g., such as a packed decimal or zone decimal key; involve some alternate sequence of sorting; etc.

Although the key may be sheared from the corresponding payload data, the particular form of the information in the key has an impact on whether a particular system, controller, program, etc. is able to actually utilize the information in the key. Accordingly, the process of normalizing the key sheared from the present record may effectively transform the key such that it is considered (e.g., referred to herein as) a "superkey" (e.g., as seen in FIGS. 5E-5I below) having a format which is supported by the system and/or controller performing the various processes of method 400.

Figure 4B:
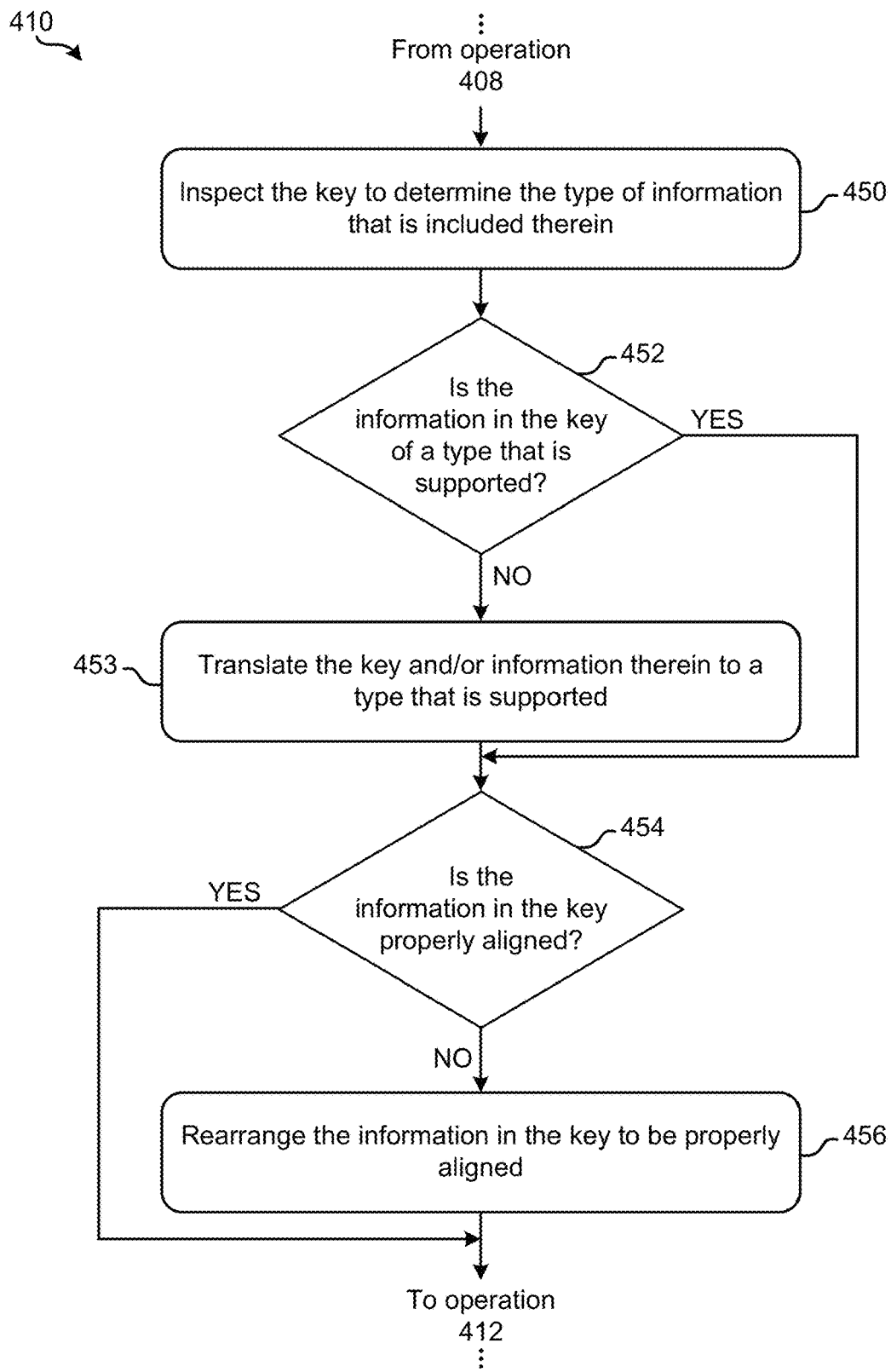
FIG. 4B is a flowchart of sub-processes for one of the operations in the method of FIG. 4A, in accordance with one embodiment.

Referring momentarily now to FIG. 4B, exemplary sub-processes of normalizing a key are illustrated in accordance with one embodiment, one or more of which may be used to perform operation 410 of FIG. 4A. However, it should be noted that the sub-processes of FIG. 4B are illustrated in accordance with one embodiment which is in no way intended to limit the invention.

As shown, sub-operation 450 of normalizing a key according to some approaches includes actually inspecting the key to determine the type of information that is included therein. As noted above, certain types of information may not be used in its current state in some approaches and therefore are changed before any further processing of the information can occur. It follows that the type of data that is actually included in the payload itself may be used to determine whether to transform the normalized sheared key. Accordingly, decision 452 includes determining whether a type of information that is included in the key is supported by the given approach. This determination may be made by comparing the type of key information and/or other information therein with a predetermined list of keys and/or information types that are supported by the system and/or the various components included therein.

In response to determining that the type of the information in the key is not supported, the flowchart proceeds to sub-operation 453 which includes translating the key and/or information therein to a type that is supported by the system. In some approaches, the key and/or information therein may be translated to a predetermined type that is compatible with the system, while in other approaches a user may be prompted with a decision on which type to translate the key and/or information therein. It follows that the key and/or information may be translated into any desired type using processes that would be apparent to one skilled in the art after reading the present description.

From sub-operation 453, the flowchart proceeds to decision 454 which includes determining whether the information in the key is properly aligned. Although the type of key and/or information therein may be supported by the system, the information in the key itself may be misaligned in some situations. For instance, depending on the approach, payload data and/or the key itself may be aligned differently in the overarching record. In some records, portions of the key may be misaligned and interspersed among the payload data itself, while in other records, the key information may be arranged in a contiguous manner. In situations where the key information and/or the payload data is misaligned, it is desirable that the information and/or data is rearranged such that the key and corresponding payload data are easily distinguishable.

Accordingly, in response to determining that the information in the key is not properly aligned, the flowchart proceeds from decision 454 to sub-operation 456. There, sub-operation 456 includes rearranging the information in the key to be properly aligned. This effectively normalizes the key according to some approaches before returning to operation 412 of FIG. 4A as shown.

In some approaches, which are in no way intended to limit the invention, sub-operation 456 includes attaching a stability index to the sheared key. The stability index helps maintain a relative order of the payload data in the given record with respect to other payload data. For instance, the stability index may be used to retain an order of the payload data from the given record relative to the other payload data in the second target area of memory from various other records.

However, returning to decision 452, the flowchart may proceed directly to decision 454 in response to determining that the type of key and/or the information therein is supported. By avoiding any translation of the key and/or information therein and thereby reducing computational overhead associated with performing the sub-processes of FIG. 4B, efficiency of the overall system is improved. Similarly, the flowchart may proceed directly to operation 412 of FIG. 4A from decision 454 in response to determining that the information in the key is properly aligned.

Returning now to FIG. 4A, operation 412 includes storing the normalized sheared key in a first target key-record area of memory. In other words, operation 412 includes storing the normalized sheared key in a predetermined portion of memory. Moreover, decision 414 includes determining whether the given record is a variable length record. As mentioned above, the payload data and/or the key may have variable lengths in some records. While this varying length may be utilized to better accommodate certain groupings of data depending on the given approach, it is more difficult to allocate an amount of space in various buffers, memory, etc., that is sufficiently large to store the data itself, but which also does not unnecessarily waste storage capacity by leaving it unutilized. Accordingly, records having a variable length may be normalized in certain situations to have a fixed length to avoid any inefficiencies that may otherwise be caused by how the record is ultimately processed. For example, a sheared key portion of a variable length record may be normalized to be of a fixed length, while the corresponding payload may remain of varying length. However, in other instances appended records may be modified to be of a specific length, e.g., as would be appreciated by one skilled in the art after reading the present description.

With continued reference to FIG. 4A, method 400 jumps directly to operation 418 in response to determining that the given record is a variable length record. There, operation 418 includes storing the payload data in a second target area of memory which is different than the first target key-record area of memory. In other words, the payload data remains decoupled from the corresponding key, e.g., as will be described in further detail below.

However, in response to determining that the given record is not a variable length record, method 400 proceeds to decision 416 from decision 414. There, decision 416 includes determining whether a size of the payload data in the given record is outside a first predetermined range. However, it should be noted that "outside a first predetermined range" is in no way intended to limit the invention to values outside a given range. For example, equivalent determinations regarding range may be made, e.g., as to whether a value is within a predetermined range, whether a value is above a threshold, whether an absolute value is above a threshold, whether a value is below a threshold, etc., depending on the desired approach.

As previously mentioned, moving data between different locations in a storage system introduces latency and reduces the operating efficiency of the system as a whole. Moreover, the sheared keys undergo a considerable amount of processing in order to successfully store and/or process the received blocks of data which correspond thereto. It follows that removing the payload data from the respective key prior to the aforementioned processing for at least some of the records would reduce the latency experienced by effectively decreasing the amount of information that is processed.

While keeping the sheared normalized keys decoupled from the respective payload data has desirable effects on performance of the system, these improvements are at least somewhat proportional to the amount of data that is not being processed. It follows that for certain situations in which the payload data is sufficiently small in size and the added compute overhead introduced by processing the payload data is negligible, it may be desirable to recombine the payload data with the normalized key. Thus, by determining whether the size of the payload data in the given record is outside a first predetermined range, decision 416 is effectively able to determine whether the payload data should remain decoupled from the sheared normalized keys during further processing.

With continued reference to FIG. 4A, the first predetermined range utilized in decision 416 may be set by a user, correspond to the type of key, be based on the type of storage being used, etc. Accordingly, decision 416 may involve actually identifying the first predetermined range that corresponds to the currently evaluated key and/or the initial record. In response to determining that the size of the payload data in the given record is outside the first predetermined range, method 400 proceeds from decision 416 to operation 418. There, operation 418 includes storing the payload data in a second target area of memory. Again, in situations where the payload data is sufficiently large in size, it is preferred that the sheared key remains decoupled from the payload data during processing. Thus, by storing the payload data in a second target area of memory, the payload data is maintained in its current state, e.g., until the key has been fully processed. The second target area of memory may, in some approaches, be lower performance storage than the first target key-record area of memory and/or lower performance storage than the memory in which the input data buffer is formed. This desirably frees storage capacity in higher performance memory, thereby affectively increasing the achievable throughput of the overarching system.

While the payload is actually stored in the second target area of memory, it is desirable that the key is updated to reflect this storage location for future operations. For instance, once the key has been sufficiently processed, it may be recombined with the payload data and/or data operations may be performed using the payload data itself. Accordingly, operation 420 includes appending a data locator to the normalized sheared key in the first target key-record area of memory to form a sheared record. The data locator preferably corresponds to a storage location of the payload data in the second target area of memory so that the key is able to reflect the storage location as mentioned above. This allows any applications to know the location where the corresponding payload data is stored during key record and payload processing. This is particularly desirable in situations involving the sort process, as the sort process eventually involves transforming the record by restoring the key record and payload data (referenced by the data locator) into a single continuous area of storage, e.g., such that it can be written to a storage location in memory.

Depending on the approach, the process of appending the data locator to the normalized sheared key may include updating a header of the key, actually writing the data locator in a padded (e.g., unused) portion of the key, etc., or any other processes which would be apparent to one skilled in the art after reading the present description. In some approaches the data locator may also be stored in a central lookup table, e.g., such as a logical-to-physical lookup table, or elsewhere for redundancy.

According to an example, which is in no way intended to limit the invention, the data locator may be an 8-byte field. Accordingly, for variable length records being processed in shearing cases, the data locator may include a 2-byte length field, where the high order bit of this field is used as a location bit. This location bit may be configured such that a value of "1" indicates that the corresponding payload data is located in external physical storage, while a value of "0" indicates that the corresponding payload data is located in internal system memory (e.g., see FIGS. 4C-4D below). As a result, the remaining 15 bits may be used to represent the length of the corresponding payload data up to 32767. The data locator may also include a 6-byte offset to the memory location where the payload data portion of the record resides, relative to the beginning of the object in the internal system memory when the location bit is set to "0". However, when the location bit is set to "1", the 6-byte offset may actually contain the location in external physical storage where the data has been stored.

Moreover, for fixed length records being processed in shearing cases, the data locator may include a high order bit which is used as a location bit. As noted above, this location bit may be configured such that a value of "1" indicates that the corresponding payload data is located in external physical storage, while a value of "0" indicates that the corresponding payload data is located in internal system memory (e.g., see FIGS. 4C-4D below). The remaining 63-bits may be used as a pointer to the memory location where the payload data portion of the record resides, relative to the beginning of the object in the internal system memory when the location bit is set to "0". However, when the location bit is set to "1", the remaining 63-bits may actually contain the location in external physical storage where the data has been stored.

From operation 420, method 400 proceeds to operation 422 which includes causing a sorting operation to be performed on the sheared records in the first target key-record area of memory. As previously mentioned, by determining that the payload data is sufficiently large in size and keeping it decoupled from the key, performing record processing such as data sorting is much more efficient than has been conventionally achievable. This allows for performance of the overall system to be improved.

It should also be noted that the process of causing the sorting operation to be performed on the sheared records may vary depending on the approach. For instance, the specific processes involved with performing the sorting operation may differ depending on the specific type of sorting operation, the types of information that are included in the key, user preferences, etc. It follows that the process of causing a sorting operation to be performed on the sheared records may involve sending one or more instructions to one or more logical and/or physical components in the storage system, e.g., as would be appreciated by one skilled in the art after reading the present description.

From operation 422, the flowchart of FIG. 4A proceeds to decision 430 which includes determining whether each of the records in the input data buffer have been evaluated. In response to determining that at least one record remains in the input data buffer unevaluated, method 400 returns to operation 406 and advances to the next of the at least one record that remains in the input data buffer such that various ones of the processes included in FIG. 4A may be repeated for the next record. However, in response to determining that each of the records in the input data buffer have been evaluated, method 400 proceeds from decision 430 to operation 432 where method 400 may end. However, it should be noted that although method 400 may end upon reaching operation 432, any one or more of the processes included in method 400 may be repeated in order to process additional blocks of data. In other words, any one or more of the processes included in method 400 may be repeated for subsequently received blocks of data.

Returning now to decision 416, it should be noted that method 400 proceeds to operation 424 in response to determining that the size of the payload data in the given record is not outside the first predetermined range. There, operation 424 includes combining the normalized sheared key with the corresponding payload data to form an appended record. As previously mentioned, while keeping the sheared normalized keys decoupled from the respective payload data has desirable effects on performance of the system, these improvements are at least somewhat proportional to the amount of data that is not being processed. It follows that for certain situations, e.g., such as those in which the payload data is sufficiently small in size and the added compute overhead introduced by processing the payload data is negligible, it may be desirable to recombine the payload data with the normalized key. Thus, by determining that the size of the payload data in the given record is not outside a first predetermined range, method 400 has effectively determined that the payload data can be coupled to the previously sheared keys before performing further processing, e.g., because processing the payload data also will not have a sufficiently negative affect on performance of the overall system.

From operation 424, method 400 proceeds to operation 426 which includes storing the appended record in the first target key-record area of memory. In other words, operation 426 includes storing the payload data in addition to the corresponding key in the first target key-record area of memory. Furthermore, operation 428 includes actually causing a sorting operation to be performed on the appended records in the first target key-record area of memory. As previously mentioned, by determining that the payload data is sufficiently small in size, recoupling it to the key before performing record processing such as data sorting does not significantly affect the performance in a negative way. Moreover, the process of causing the sorting operation to be performed on the appended records may vary depending on the approach. For instance, the specific processes involved with performing the sorting operation in operation 422 may differ from the specific processes involved with performing the sorting operation in operation 428, e.g., as would be appreciated by one skilled in the art after reading the present description.

From operation 428, the flowchart of FIG. 4A may end. However, it should be noted that although method 400 may end in response to performing operation 428, any one or more of the processes included in method 400 may be repeated in order to process additional blocks of data. In other words, any one or more of the processes included in method 400 may be repeated for subsequently received blocks of data.

It follows that the various processes included in method 400 are desirably able to significantly reduce the amount of computing resources that are consumed while performing record processing operations. For record processing operations such as data sorting, this reduction in resource consumption is achieved, at least in part, as a result of effectively reducing the amount of data movement within storage that is conducted in order to perform and/or as a result of performing the record processing. For instance, by shearing a key from the payload data in a given record such that the record may effectively be processed without moving and/or analyzing the payload data itself, some of the approaches included herein are able to significantly improve the efficiency at which the overarching system is able to operate, while also maintaining successful data operations.

Records that have been sorted are preferably contained in units of memory which are also referred to herein as "chunks". It follows that a run of sorted records may be contained in a queue of chunks, and a set of runs may further be maintained in a run queue (e.g., by a sort manager). The number of chunks in a run and the number of runs in a run queue are dependent on the amount of memory that is being used for the particular sort. As described above, shearing can be used to minimize data drag in memory for larger records. Again, when shearing is conducted, a data locator is appended to the key record, such that the key record is comprised of the key portion of the record and the data locator. It follows that a given run will contain a queue of chunks comprised of key records, and some associated chunks that contain the payload portions of the records.

However, it is also desirable that the system is able to select where various data is stored based on factors including memory capacity settings. For instance, while removing the payload data from the respective key prior to performing a data operation such as data sort for at least some of the records reduces the latency experienced by effectively decreasing the amount of information that is processed, it is also desirable that the system is able to select the storage location for the various data. In some situations, the payload data may be small enough to remain stored in system memory (e.g., such as RAM) without negatively affecting the storage capacity of the system memory. However, in other situations the payload data may have a larger size which would consume an undesirably high percentage of the system memory if stored therein, thereby limiting the achievable throughput of the system.

When memory constraint begins to occur, records and/or portions of records are preferably evicted to some external physical storage, e.g., such as disk, magnetic tape, etc. The eviction process ultimately causes chunks in memory to be written to chunks in the external physical storage (e.g., external chunks), where a collection of external chunks is managed as an external list. Moreover, for approaches which incorporate record shearing, one option includes evicting payload chunks while the key record chunks for a run in memory remain in system memory. Another option includes evicting both payload chunks and the corresponding key record chunks. The option that is ultimately implemented during operation may depend on the amount of pressure on memory (including the number of runs that are to be evicted), as well as whether payload data and/or keys are chosen for eviction, e.g., as will be described in further detail below.

It follows that by determining whether payload data and/or the corresponding keys are sufficiently large, at least some of the approaches herein are able to prevent situations where the system throughput would otherwise be throttled by memory capacity issues. Looking now to FIG. 4C, a flowchart of a method 460 for reducing internal memory strain while manipulating data during record processing is shown according to one embodiment. The method 460 may be performed in accordance with the present invention in any of the environments depicted in FIGS. 1-4B, among others, in various embodiments. For example, at least a portion of method 460 may be run in the background to monitor system conditions while also avoiding interrupting performance of method 400 during nominal system performance. Of course, more or less operations than those specifically described in FIG. 4C may be included in method 460, as would be understood by one of skill in the art upon reading the present descriptions.

Each of the steps of the method 460 may be performed by any suitable component of the operating environment. For example, one or more of the operations included in method 460 may be performed by a central storage controller that is electrically coupled to an input buffer as well as various portions of memory. In other embodiments, one or more of the operations included in method 460 may be performed by a controller at a cloud processing location that is coupled (e.g., via a network connection) to a storage system having internal memory as well as an external physical storage location that is removed from the storage system. It follows that any one or more of the processes included in method 460 may actually be performed by sending one or more instructions (e.g., causing) to the internal memory and/or the external physical storage location. In still other embodiments, the method 460 may be partially or entirely performed by a controller, a processor, a computer, etc., or some other device having one or more processors therein. Thus, in some embodiments, method 460 may be a computer-implemented method. In such embodiments, the computer used to implement the method may include the tape drive itself or a portion thereof such as the controller, the tape, an external host, a server, etc. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 460. Illustrative processors include, but are not limited to, a central processing unit (CPU), an application specific integrated circuit (ASIC), a field programmable gate array (FPGA), etc., combinations thereof, or any other suitable computing device known in the art.

Figure 4C:
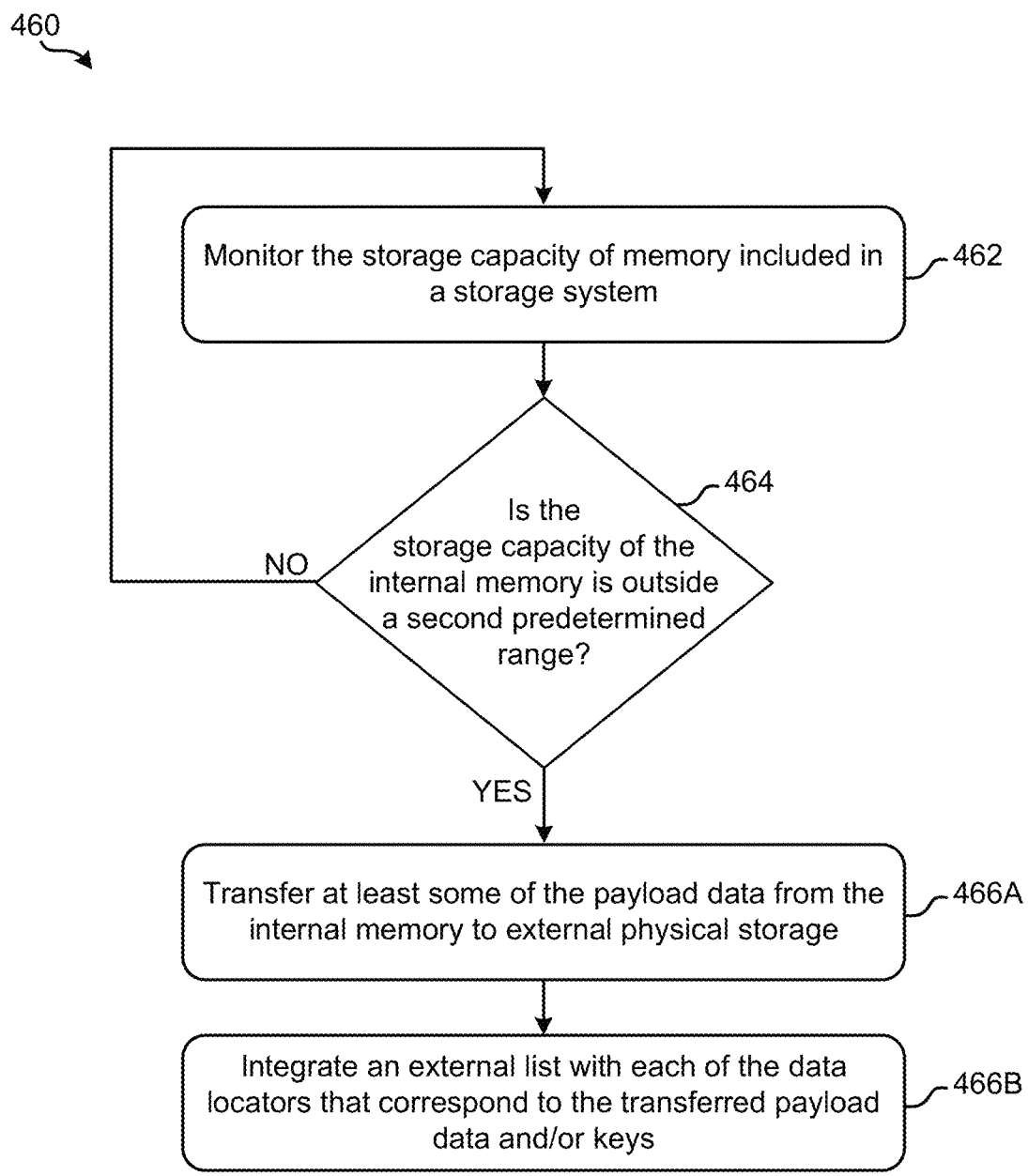
FIG. 4C is a flowchart of a method, in accordance with one embodiment.

As shown in FIG. 4C, operation 462 of method 460 includes monitoring the storage capacity of memory included in a storage system. In other words, operation 462 includes monitoring the amount of available (e.g., unused) storage in internal memory of the system. As noted above, in situations where the payload data is sufficiently large in size, it is preferred that the sheared key remains decoupled from the payload data during processing to reduce computational overhead. Thus, by storing the payload data in system memory separate from the corresponding key(s), the payload data may be maintained in its current state, e.g., until the key(s) have been fully processed. However, in some situations the memory included in the storage system may become undesirably full, thereby limiting the number of additional records that may be processed. It follows that by monitoring the storage capacity of memory included in a storage system, operation 462 is able to identify situations where the amount of available storage in the internal memory falls below a desired level.

Accordingly, decision 464 includes determining whether the storage capacity of the internal memory is outside a second predetermined range. Decision 464 thereby effectively determines whether the internal memory of the system is sufficiently available that additional processing may be performed without experiencing memory overflow situations. However, it should be noted that "outside a second predetermined range" is in no way intended to limit the invention to values outside a given range. For example, equivalent determinations regarding range may be made, e.g., as to whether a value is within a predetermined range, whether a value is above a threshold, whether an absolute value is above a threshold, whether a value is below a threshold, etc., depending on the desired approach. The second predetermined range may also be set by a user, correspond to the type of key, be based on the type of storage being used, correspond to an overall capacity of the memory, etc. Accordingly, decision 464 may involve actually identifying the second predetermined range that corresponds to the given memory.

In response to determining that the storage capacity of the internal memory is not outside the second predetermined range, the flowchart of method 460 returns to operation 462 such that the internal memory of the system may continue to be monitored before repeating decision 464. It follows that processes 462 and 464 may be repeated in an iterative fashion any desired number of times during operation of the system to maintain an accurate understanding of the current storage capacity of the internal memory.

However, in response to determining that the storage capacity of the internal memory is outside the second predetermined range, the flowchart of method 460 advances to operation 466A. There, operation 466A includes transferring at least some of the payload data from the internal memory to external physical storage. In other words, operation 466A includes evicting data from the internal system memory to physical storage that is external to the system such that the unused storage capacity of the internal memory is increased. According to an example, which is in no way intended to limit the invention, system memory may include RAM while the external memory may include physical disks, magnetic tape, etc.

It should be noted that once at least some of the payload data has been transferred to the remote physical storage, the data locator(s) associated with the corresponding record(s) no longer accurately reflect(s) the storage location(s) thereof. Accordingly, data locators that correspond to the transferred information (e.g., payload data and/or keys) are preferably updated to reflect the new storage locations of the information in the external physical storage. This is achieved in some approaches by integrating an external list with each of the data locators that correspond to the transferred information. Accordingly, operation 466B includes integrating an external list with each of the data locators that correspond to the transferred payload data. Each of the external lists correspond to a storage location of transferred information in the external physical storage, and thereby effectively updates the respective data locators such that the transferred information may be efficiently located in the external physical storage, e.g., as will be described in further detail below.

Referring again now to operation 466A, the payload data that is transferred from the internal memory to external physical storage may be selected by identifying one or more runs from a run queue, for which some or all of the associated chunks may be evicted. As noted above, a run of sorted records may be contained in a queue of chunks, and a set of runs may further be maintained in a run queue (e.g., by a sort manager). It follows that for a given run, some or all of the associated payload chunks and/or the associated key-record chunks may be evicted, e.g., depending on memory pressure. Ultimately, the eviction manager may possess knowledge of how much memory should be reclaimed, and the run(s) selection can thereby be performed to satisfy the desired memory reclamation while minimizing the cost of the overall operation.

While keys which correspond to the payload data may also be evicted from the internal system memory in some approaches, the payload data is typically much larger in size than the corresponding keys. It follows that transferring at least some of the payload data from the internal memory will be able to create more free space than if only the keys were transferred from the internal memory. However, it should be noted that depending on the approach, payload data and/or key information may be evicted from the system memory. Thus, while in some approaches only payload data is transferred from the internal memory, in other approaches payload data and key information is transferred from the internal memory. Yet it should be noted that in some approaches only key information may be transferred from the internal memory.

For approaches in which only payload data is transferred from the internal memory to external physical storage, the payload data being transferred may be selected from the sheared records and/or the appended records. While selecting payload data from sheared records may result in the transfer being performed more efficiently as the corresponding keys have already been sheared from the payload data, the number and type of records in the system may dictate which payload data is transferred, at least to some extent. The overall size of the memory as well as how full the memory currently is may also have an effect on which payload data is selected for transfer to the external storage. For instance, as mentioned above, the eviction manager may possess knowledge of how much memory should ultimately be reclaimed which may be used to actually select the one or more runs from the run queue to satisfy this reclamation in an efficient manner. Payload data may also be selected from appended records and sheared from the corresponding key before being transferred in some instances.

For approaches in which payload data as well as the corresponding normalized sheared keys are transferred from the internal memory to external physical storage, the payload data and keys being transferred may be selected from any of the sheared records. Selecting payload data and the corresponding normalized sheared key associated with a given sheared record is desirable as the payload data is preferably transferred to the external physical storage separately from the normalized sheared key. Accordingly, in preferred approaches the process of sending the selected payload data and the selected normalized sheared keys to the external physical storage includes first sending the selected payload data to the external physical storage.

Data locators corresponding to the transferred payload data are also preferably updated prior to sending the selected normalized sheared keys to the external physical storage. Accordingly, although operation 466B is depicted in FIG. 4C as being performed following operation 466A, in some approaches where payload data and normalized sheared keys are evicted to the external physical storage, operation 466B may be performed prior to completing operation 466A. For example, operation 466A may initially include transferring selected payload data to the external physical storage, in response to which operation 466B may be performed to update the corresponding data locators, prior to completing operation 466A by transferring the keys associated with the payload data to the external physical storage.

Once the selected payload data has been removed (e.g., evicted) from the system memory, the selected normalized sheared keys may be sent to the external physical storage. It follows that a determination may be made as to whether all of the payload data has been transferred to the external physical storage prior to sending any of the normalized sheared keys. However, this is in no way intended to be limiting as the payload data and normalized sheared keys may be transferred to the external physical storage in any desired order and/or according to any preferred timing schedules. However, it may still be preferred that any data locators are updated prior to evicting any of the keys from the system memory, e.g., as described above.

Payload data and the corresponding keys may also be selected from appended records in some approaches. In such approaches, each of the keys may be sheared from the corresponding payload data prior to initiating the transfer to the external physical storage. This would allow for the payload data to be transferred to the external physical storage prior to the keys. However, it should be noted that while it is desirable the payload data is evicted from the system memory prior to the corresponding keys, in some approaches the keys may be transferred to the external physical storage prior to the payload data. However, it again may be preferred that any data locators are updated prior to evicting any of the keys from the system memory, e.g., as described above. In still other approaches, the payload data and corresponding keys may remain appended to each other and be transferred to the external physical storage as appended records. The process of selecting payload data and corresponding keys may thereby involve selecting ones of the appended records for eviction from system memory. It follows that the order and configuration of the information that is transferred to the external physical storage may vary depending on the desired approach.

In some embodiments, the eviction process may be performed by presenting a set of key record chunks to an eviction manager, while a sort manager determines how much of a run should be evicted from the system memory. As previously mentioned, some or all of the payload chunks may be evicted for the runs that are selected, while in other situations some or all of the key record chunks may be evicted for the runs selected. In situations where only payload chunks are being evicted, a single external list (represented by an external list number) may be chosen for each run by the sort manager, and stored in the control block for the run. With respect to the present description, it should be noted that each "external list" corresponds to a storage location of transferred data in the external physical storage, and thereby may be used to effectively update data locators such that the transferred data may be efficiently located in the external physical storage.

In situations where both payload chunks and corresponding key record chunks are being evicted, two external list numbers are chosen by the sort manager and stored in the control block for the run. The sort manager may thereby queue one or more key record chunks to the eviction manager and will request the mode of eviction (i.e., payload data or key record). If both key records and payload data are being evicted for a run, the sort manager preferably first requests that payload data is first evicted, after which the sort manager requests that key records be evicted. The eviction manager request may also contain the queue of chunks to process, the mode, and the target external list (e.g., target storage location in the external physical storage).

The eviction manager may process each eviction request by obtaining a target location (e.g., such as a set of tracks large enough to contain the chunk, a set of blocks on a fixed block logical unit number (LUN) large enough to contain the chunk, etc.) for each chunk that is to be evicted from system memory. An I/O (or whatever other operation(s) are associated with actually evicting the data) may thereby be performed, and the sort manager is notified when the request has been completed. Once a chunk has been evicted from the system memory, the sort manager is able to reuse the chunk(s) where the data has been evicted from. The eviction manager may also maintain a queue of locations in the external physical storage (preferably in order), so that the evicted data can later be retrieved by the sort manager in the proper sorted order (e.g., see FIG. 4D below). The eviction process for payloads also involves transforming the data locators for the corresponding key records such that the location bit is changed from "0" to "1", and the external list number is stored, e.g., as mentioned above.

The payload data and/or the corresponding keys may be sent to the external physical storage along with one or more instructions to actually store the payload data and/or keys therein. The instructions may be sent to a storage controller, a network processor, etc., or some other type of computing device which is able to communicate with and actually cause the information to be written in the external physical memory. The instructions may also specify a specific location where the information should be stored. According to an example which is in no way intended to limit the invention, payload data and/or keys transferred from a same run in the system memory may be stored in a same disklist (e.g., a preferred external list) of external disk storage. The payload data and/or keys may thereby be sent to the external physical storage with an indication of the specific disklist in which the information is to be stored.

It should also be noted that the eviction manager and/or the sort manager may effectively operate (e.g., run) on a processor, e.g., as would be appreciated by one skilled in the art after reading the present description. Moreover, the processor operating the eviction manager and the sort manager may be located in the storage system, at a cloud computing environment, at the remote physical storage location, etc. However, the eviction manager and/or the sort manager may be configured differently depending on the desired approach. For instance, in some approaches one or both of the eviction manager and the sort manager may be implemented in a dedicated module.

Once payload data and/or a corresponding key has been transferred to the remote physical storage, the data locator associated with the given record no longer accurately reflects the storage location thereof. Accordingly, with continued reference to FIG. 4C, operation 466B includes integrating an external list with each of the data locators that correspond to the transferred payload data and/or keys. As noted above, each of the external lists correspond to a storage location of transferred payload data and/or a key in the external physical storage, and thereby effectively updates the respective data locators such that the transferred information may be efficiently located in the external physical storage. As a result, the transferred information may be accessed in a much more efficient manner than would otherwise be achievable, e.g., by sequentially inspecting the information stored in the external physical storage until a desired portion is identified.

A data locator may have different forms depending on the particular approach. For instance, a different type of data locator may be used for fixed length records than is used for variable length records. As mentioned above, payload data and/or a key may have variable lengths in some records, thereby forming a variable length record. While this varying length may be utilized to better accommodate certain groupings of data depending on the given approach, it is more difficult to allocate an amount of space in various buffers, memory, etc., that is sufficiently large to store the data itself, but which also does not unnecessarily waste storage capacity by leaving it unutilized.

The same is true when applying a data locator to the normalized sheared key. For instance, in response to determining that a given record is a variable length record, a data locator which implements an offset value and a length of the variable length record is preferably used to identify the storage location of the record in the system storage. As noted above, the offset value and length provide an accurate depiction of the record despite its variable length, thereby making data retrieval more efficient. Again, because a variable length record does not have a standardized length (e.g., size), referencing the record using a standard pointer would introduce processing overhead to the system. While the standard pointer may effectively identify a starting point of the variable length record, there is no way to know the extents of the record without actually inspecting the record itself, thereby introducing processing overhead and processing delays as alluded to above. However, by referencing the variable length record using an offset to identify the beginning of the record as well as a length of the record itself, the extents of the record may be easily determined. It follows that for variable length records, having the length in the data locator enables efficient memory access, thereby avoiding any memory accesses to the payload chunks to obtain the specific length of the record. For instance, the offset and length allow for information to be retrieved by only accessing storage in the key record and not accessing the storage in the payload record area. This also reduces cache pollution and translation lookaside buffer pollution (TLB), e.g., as would be appreciated by one skilled in the art after reading the present description.

For example, a data locator having a plurality of bits may be used for variable length records. The external list may thereby be represented by a bit in the data locator which may be set to indicate that an external list has been integrated with the corresponding data locator. The data locator itself may also have 15 bits that are used to represent a length field for variable length records, and a remaining 48 bits that are used to represent an offset value for variable length records as well. As a result, the information that may be retained by the various bits in the data locator decreases the amount of processing that is associated with actually locating the payload data, e.g., for retrieval. This allows any applications to know the location where the corresponding payload data is stored during key record and payload processing. This is particularly desirable in situations involving the sort process, as the sort process eventually involves transforming the record by restoring the key record and payload data (referenced by the data locator and external list) into a single continuous area of storage, e.g., such that it can be written to a storage location in memory. Again, this reduction in processing overhead is achieved in addition to improving the overall storage capacity of internal memory for the system, e.g., as would be appreciated by one skilled in the art after reading the present description.

However, in response to determining that a given record is not a variable length record (e.g., see decision 414 above), a simple pointer may be used to identify the storage location of the record in the system storage.

It follows that the various processes included in method 460 are able to accurately and efficiently monitor the status of internal storage memory. Moreover, in situations where the internal memory is experiencing undesirable levels of strain, the above processes are able to transfer data to external physical storage at least temporarily. This effectively creates more useable space in the internal memory to maintain system throughput while also ensuring successful data retention. However, data stored in the external physical storage may be reconstituted in certain situations. For example, payload data that has been evicted to the external physical storage may be requested in a read operation, be queued for long-term storage, etc. Accordingly, the process of locating, accessing, and returning the information stored at the external physical storage is preferably done using the data locators and corresponding external lists.

In situations where a sort manager wishes to consume an evicted run (e.g., as an input to a merge process to produce a larger, sorted run), it requests that the beginning portion of the data stored in the external list(s) be read in by the eviction manager. The sort manager may thereby queue a request to the eviction manager, providing chunks where the data can be read into. In situations where both key record chunks and payload chunks were evicted from the system memory, a request that the first chunks in the external storage for each external list be read may be issued. The eviction manager may thereby process the request by reading the first chunks into the target memory chunks.

Figure 4D:
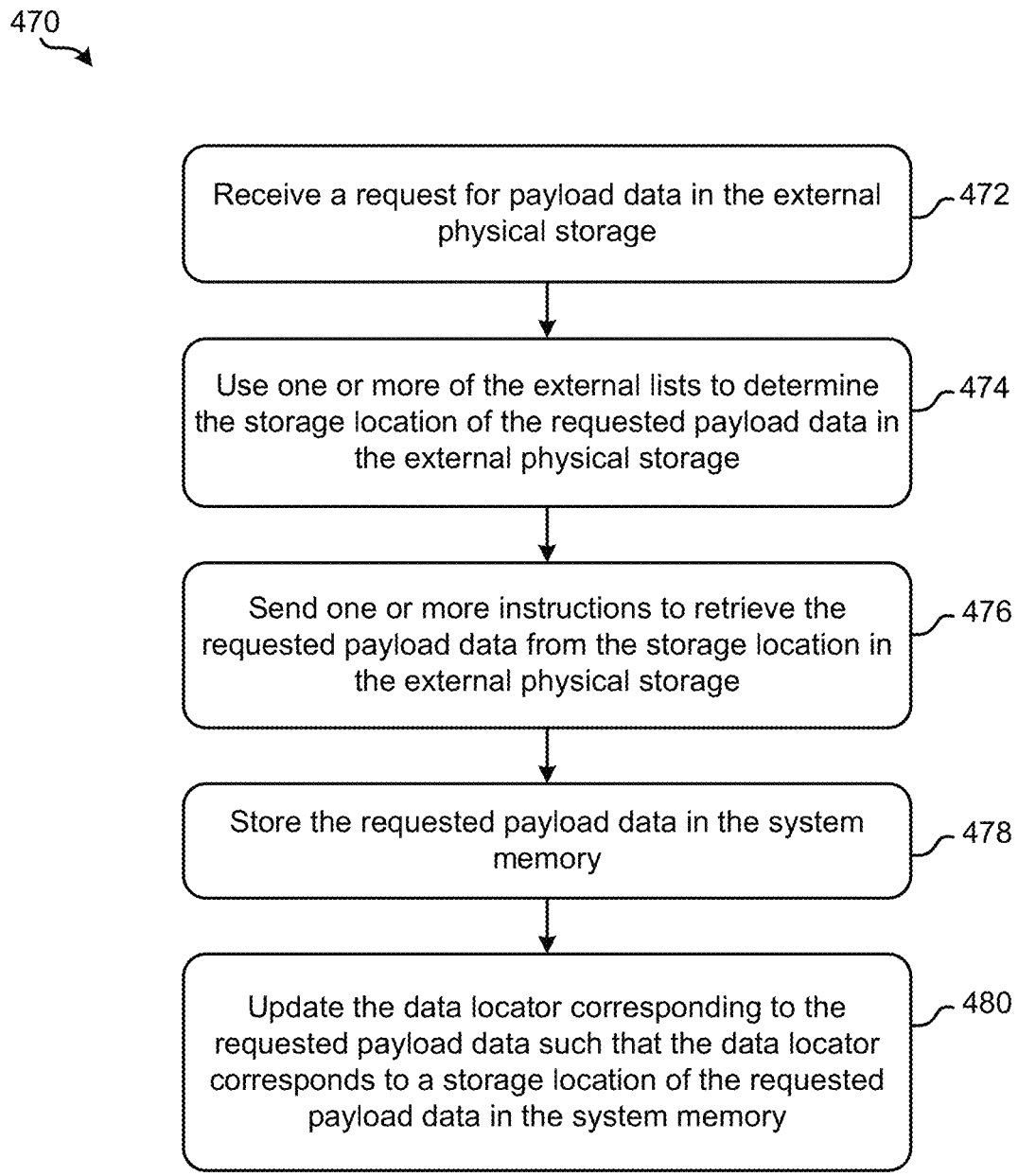
FIG. 4D is a flowchart of a method, in accordance with one embodiment.

Looking now to FIG. 4D, a flowchart of a method 470 for reconstituting information stored in the external physical storage is shown according to one embodiment. The method 470 may be performed in accordance with the present invention in any of the environments depicted in FIGS. 1-4C, among others, in various embodiments. For example, at least a portion of method 470 may be run in the background to monitor system conditions while also satisfying incoming requests without interrupting performance of method 400 and/or method 460 during nominal system performance. Of course, more or less operations than those specifically described in FIG. 4D may be included in method 470, as would be understood by one of skill in the art upon reading the present descriptions.

Each of the steps of the method 470 may be performed by any suitable component of the operating environment. For example, one or more of the operations included in method 470 may be performed by a central storage controller that is electrically coupled to an input buffer as well as various portions of memory. In other embodiments, one or more of the operations included in method 470 may be performed by a controller at a cloud processing location that is coupled (e.g., via a network connection) to a storage system having internal memory as well as an external physical storage location that is removed from the storage system. It follows that any one or more of the processes included in method 470 may actually be performed by sending one or more instructions (e.g., causing) to the internal memory and/or the external physical storage location. In other embodiments, the method 470 may be partially or entirely performed by a controller, a processor, a computer, etc., or some other device having one or more processors therein. Thus, in some embodiments, method 470 may be a computer-implemented method. In such embodiments, the computer used to implement the method may include the tape drive itself or a portion thereof such as the controller, the tape, an external host, a server, etc. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 470. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4D, operation 472 of method 470 includes receiving a request for payload data in the external physical storage. The type of request that is received varies depending on the particular approach and may include a read request, a data deletion request, a data modification request, etc. The request may also be received from a running application, another storage system, a user, etc., depending on the approach. It should also be noted that while operation 472 includes receiving a request for payload data in the external physical storage, requests may be received which identify keys in the external physical storage, appended payload data and key pairs (appended records) in the external physical storage, etc.

Furthermore, operation 474 includes using one or more of the external lists to determine the storage location of the requested payload data in the external physical storage. As noted above, a data locator is preferably updated when payload data is transferred to the external physical storage to reflect the storage location of the payload data therein. Accordingly, data locators which correspond to requested payload data may be used to actually find the requested payload data in the external physical storage.

Operation 476 thereby includes sending one or more instructions to retrieve the requested payload data from the storage location in the external physical storage. As noted above, the one or more instructions may be sent to a storage controller, a network processor, etc., or some other type of computing device which is able to communicate with and actually cause the payload data to be found and read from the external physical memory. While the instructions sent may specify the specific location(s) where the requested payload data is stored in some approaches, in other approaches the data locators may actually be sent to the external physical storage along with one or more instructions to use the data locators to find and return the requested payload data.

In response to actually receiving the requested payload data, operation 478 includes storing the requested payload data in the system memory. According to some approaches, the requested payload data may be stored in the second target area of system memory, while in other approaches the payload data may be stored in the first target area of system memory. Furthermore, operation 480 includes updating the data locator corresponding to the requested payload data such that the data locator corresponds to a storage location of the requested payload data in the system memory. As noted above, the data locator is preferably updated to reflect the new storage location of data that has been transferred to the external physical storage. Accordingly, it is preferred that the data locator is updated again when payload data is returned to the system memory. It follows that in some approaches updating the data locator corresponding to the requested payload data includes removing the external list from the data locator. For example, a bit in the data locator which corresponds to an external list may be reset to indicate that the payload data no longer resides in the external physical storage (e.g., at least in accessible form). As a result, the data locator is reverted to reflect a storage location of the payload data in the system memory, e.g., as it did prior to evicting the payload data from the system memory.

The process of reconstitution preferably occurs when the payload chunks were evicted. As noted above, the key records for a run include data locators that have been transformed to represent the storage location in the external physical storage. Therefore, because the data in the external lists is in written and/or read in sorted order, the reconstitution process starts at the beginning of the key records for the given run, and reverts the corresponding data locator from an external list form to a memory indication (e.g., pointer to system memory). The payload chunks that have been read in are in sort order, so the first payload record in the restored payload chunk is the payload portion associated with the first key record in the key record chunk. It should also be noted that the reconstitution process continues until all desired records have been restored. Accordingly, the various operations included in method 470 may be repeated any desired number of times, e.g., in an iterative fashion for each of the records being reconstituted.

It should also be noted that while various ones of the approaches included herein shift the storage location of information based on the current status of the internal storage memory, data may be selectively sent to the external physical storage rather than the system memory in other approaches. For instance, payload data determined as being sufficiently large in size (e.g., exceeding a threshold number of megabytes) may automatically be sent to the external physical storage to avoid consuming an undesirably large portion of the internal system memory.

Referring now to FIGS. 5A-5L, various records and the potential contents thereof are illustrated in accordance with several embodiments. As an option, any of the embodiments depicted in FIGS. 5A-5L may be implemented in conjunction with features from any other embodiment listed herein, such as those described with reference to the other FIGS., such as FIGS. 4A-4B. However, such embodiments and others presented herein may be used in various applications and/or in permutations which may or may not be specifically described in the illustrative embodiments listed herein. Further, the embodiments presented in FIGS. 5A-5L may be used in any desired environment.

Figure 5A:
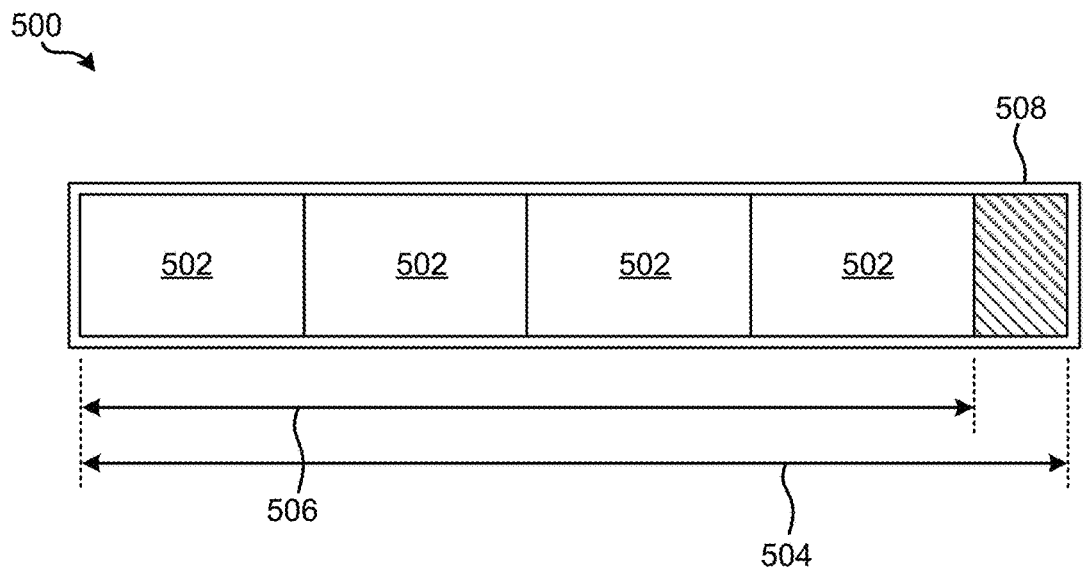
FIGS. 5A-5L are partial representational views of various records and the contents thereof, in accordance with several embodiments.

As shown, FIG. 5A depicts an input data buffer 500 which includes a number of blocks 502 therein. While the input data buffer 500 includes a number of blocks 502, the size of the buffer may not be perfectly divisible by the size of the blocks themselves. Thus, the overall length of the blocks 504 may be less than the overall length 506 of the input data buffer 500. In other words, the input data buffer 500 may include an unused portion 508 that is unable to provide an adequate amount of unused storage space to store another block. This unused portion of the buffer may be padded in some approaches, while in other approaches it may be designated as reserved space, e.g., a header for the buffer.

Each of the blocks 502 in the input data buffer 500 of FIG. 5A include a number of records therein. Accordingly, looking to FIG. 5B, a block 502 is illustrated as including a block header 510 as well as a number of logical records 512. It is also noted that the full length BlockLen of the block 502 has not been utilized, thereby leaving a portion 514 of the block 502 unused. This unused portion 514 may be padded in some approaches, while in other approaches it may simply remain unused, e.g., if the amount of information in the given block 502 changes.

Figure 5B:
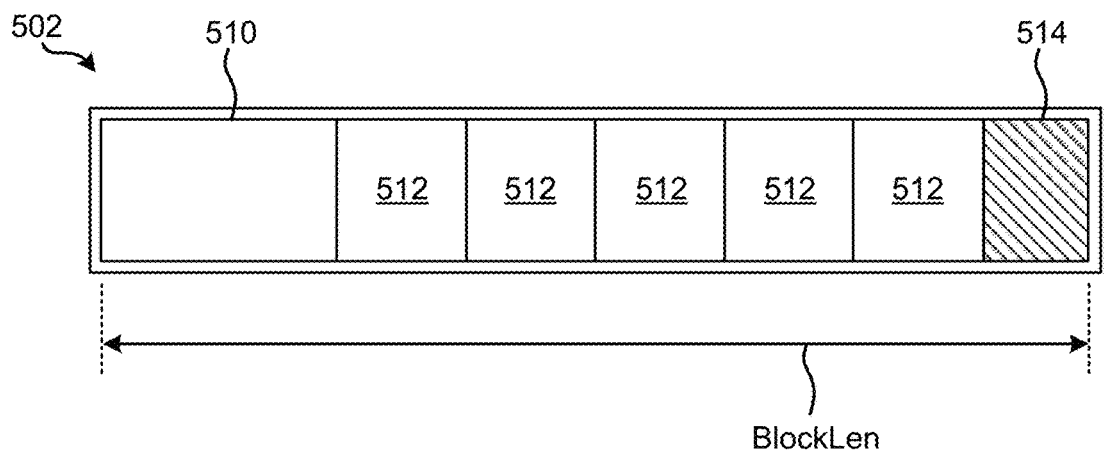
Figure 5C:
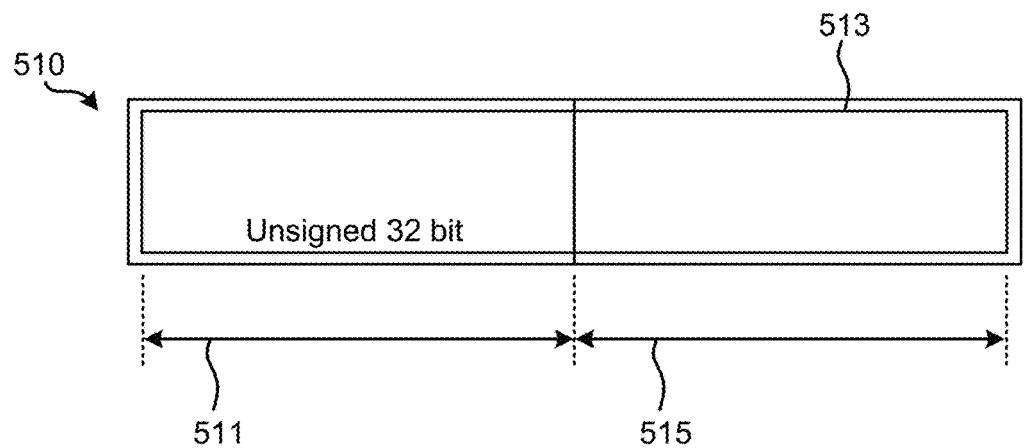
Figure 5D:
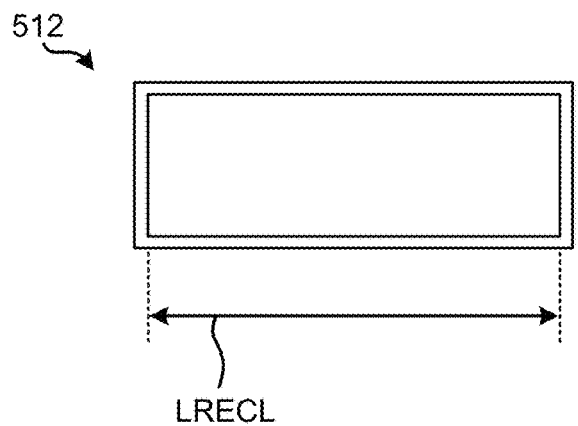

FIG. 5C further depicts a block header 510 in accordance with an illustrative approach which is in no way intended to limit the invention. Specifically, the block header 510 is depicted as having an unsigned block length (e.g., size) of 32 bits, while the length 511 of the block header itself is also represented. In some approaches, the block header length 511 is 4 bytes. The block header 510 also includes a portion of reserved (e.g., unused) space 513. The reserved space 513 may be used to store information (e.g., metadata) associated with the block header 510. Moreover, the reserved space 513 has a length 515 which in some approaches may be 4 bytes. FIG. 5D also illustrates one of the logical records 512 from FIG. 5B which has a length LRECL that is substantially similar to the lengths of the other logical records in the given block.

Referring momentarily now to FIG. 5B, each of the logical records 512 may be examined and a determination ultimately made as to whether the key and payload data therein should remain coupled to each other or sheared from each other. As noted above, this determination is made primarily on the actual size of the payload data, but other factors may be taken into consideration. For instance, variable length records may remain in a sheared state, e.g., as is shown in FIG. 5E.

Figure 5E:
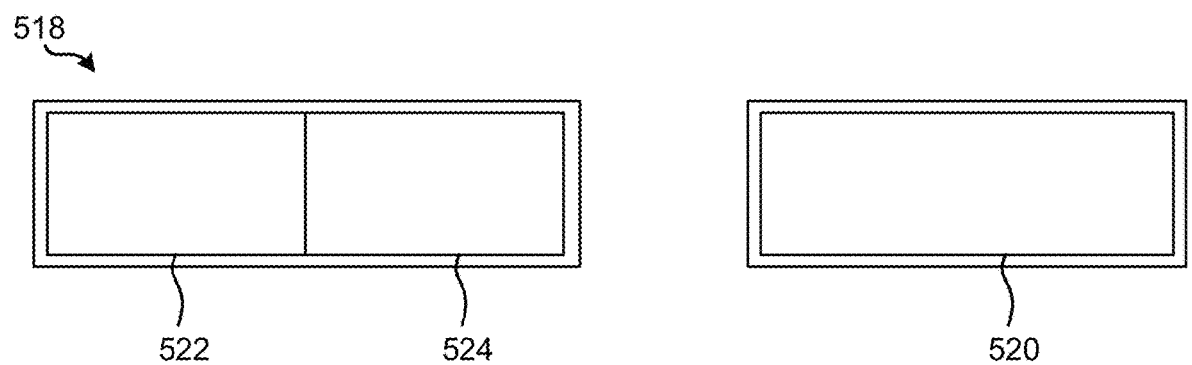

Looking to FIG. 5E, one of the records 512 depicted in the block 502 of FIG. 5A has been sheared such that the key 518 is maintained separately from the payload data 520. Moreover, the sheared key 518 itself includes a normalized key portion 522 in addition to a data locator 524 that is appended thereto. As noted above, it is preferred that a sheared key is able to locate the corresponding payload data in storage. The data locator 524 is thereby able to maintain the current storage location for the payload data. It should also be noted that for situations involving a fixed length record, the data locator 524 may simply be a pointer that points to the actual storage location of the payload data. However, in situations where the record is variable length, the data locator 524 may serve as both a pointer to the payload data storage location as well as an indication of the length of the payload data that has been sheared from the key portion 522. This allows for the payload data to be retrieved without having to actually inspect the data in order to determine where the given payload actually ends in view of its variable (e.g., otherwise unknown) length.

Figure 5F:
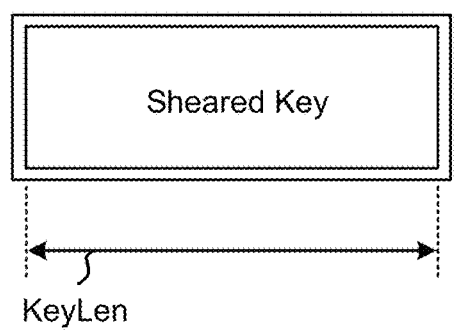
Figure 5G:
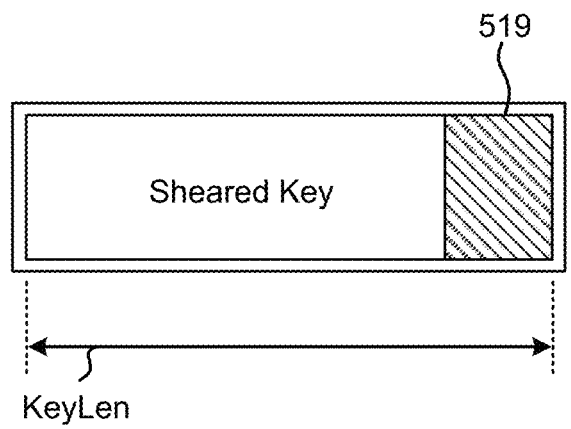
Figure 5H:
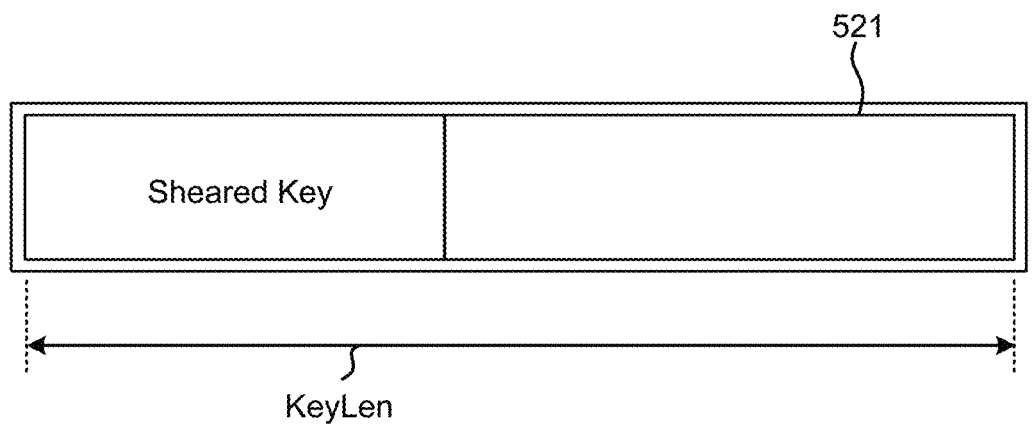
Figure 5I:
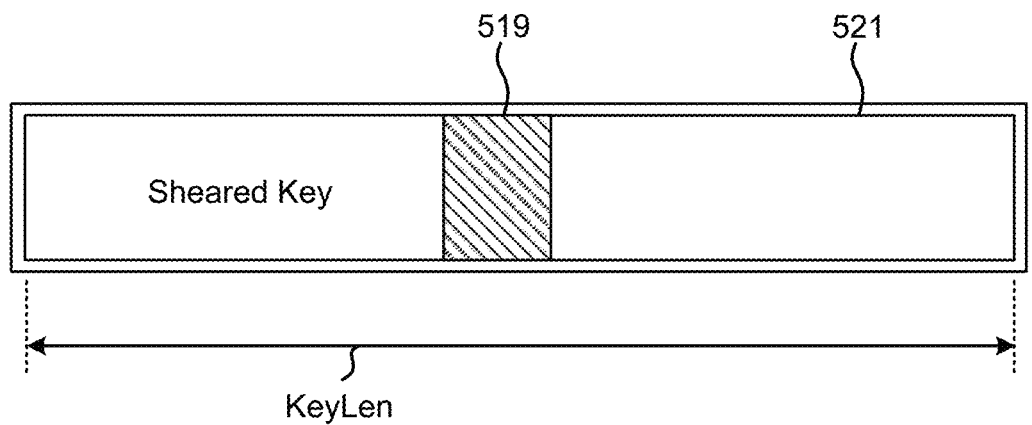

The sheared key 518 may have different forms depending on the particular approach. For instance, FIG. 5F illustrates a sheared key (e.g., extracted key) having no padding and an overall length of KeyLen, while FIG. 5G illustrates a sheared key which includes a portion of padding 519 in the overall length KeyLen of the key. Moreover, FIG. 5H depicts a sheared key having a stability index 521 appended thereto. As mentioned above, the stability index helps maintain a relative order of the payload data in the given record with respect to other payload data. For instance, the stability index may be used to retain an order of the payload data from the given record relative to the other payload data in the second target area of memory from various other records.

It should also be noted that even keys having a stability index appended thereto may incorporate a padded section. For instance, FIG. 5I includes padding 519 that separates the sheared key from the stability index 521, but in other approaches the padding 519 may be positioned before the sheared key (e.g., as a reserved header) or after the stability index 521 (e.g., as a reserved tail section).

Figure 5J:
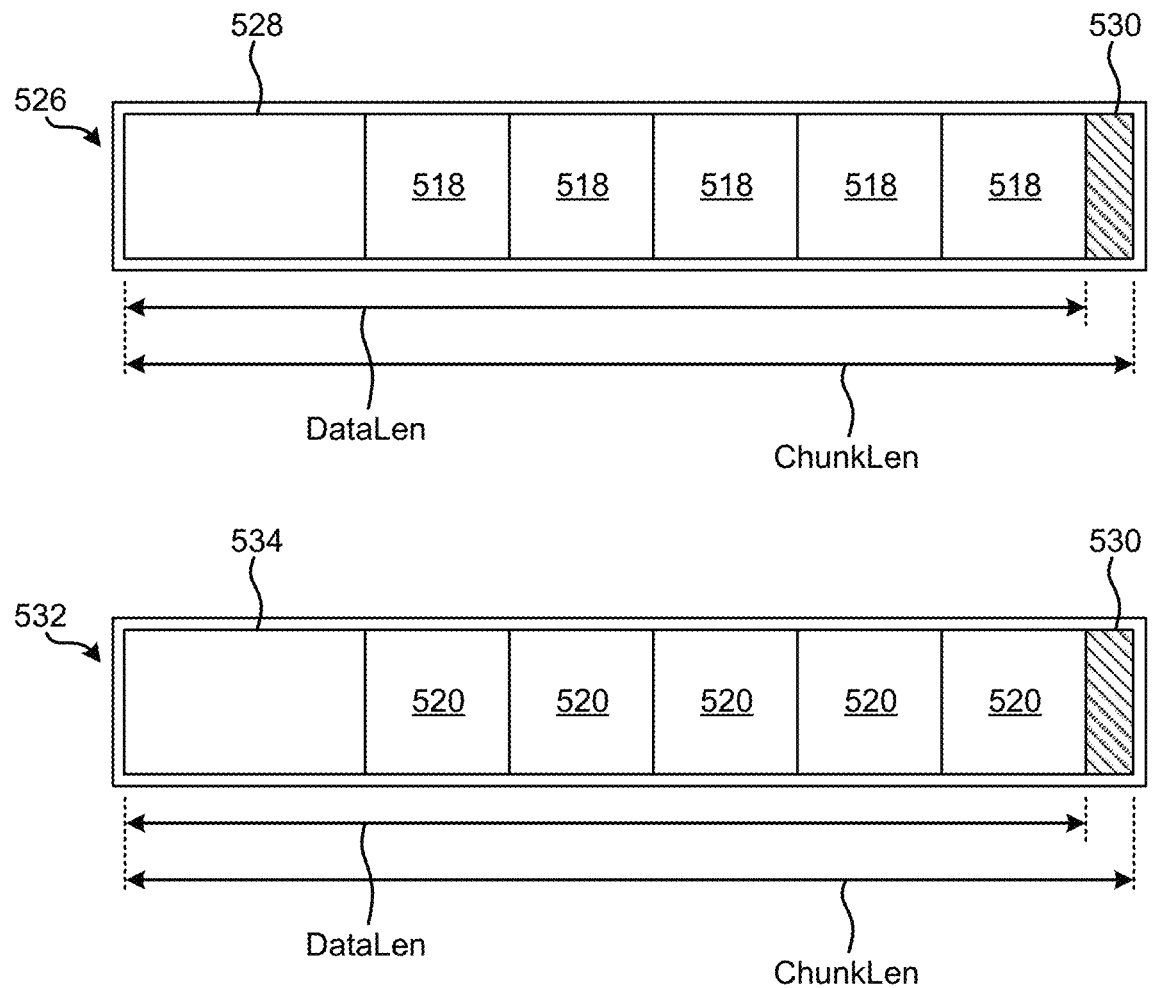

FIG. 5J further depicts the two different locations in memory where the sheared keys 518 and payload data 520 are stored. Specifically, the key chunk 526 includes a chunk header 528 as well as a number of sheared keys 518 therein. The key chunk 526 also includes a padded section 530 to compensate for the difference in the length of the data DataLen in the key chunk 526 and the overall length ChunkLen of the key chunk 526 itself. Similarly, the payload chunk 532 includes a chunk header 534 as well as a number of the payload data 520 therein. The payload chunk 532 also includes a padded section 530 to compensate for the difference in the length of the data in the payload chunk 532 and the overall length of the payload chunk 532 itself.

The key chunk 526 is preferably located in a first target key-record area of memory, while the payload chunk 532 is located in a second target area of memory. As noted above, the first target key-record area of memory may be located in memory components which have a higher level of performance than that of the memory components in which the second target area of memory is located.

Figure 5K:
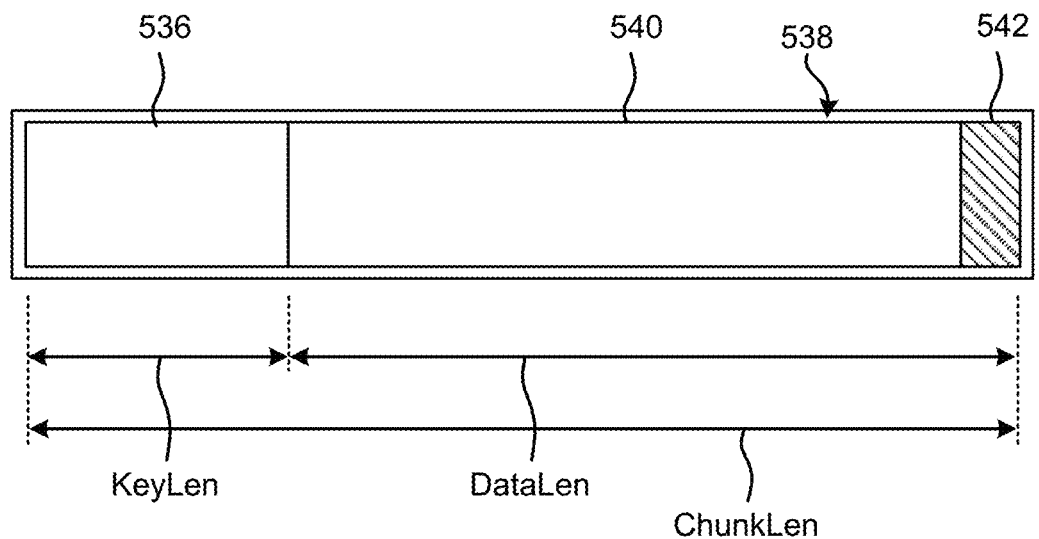

Looking now to FIG. 5K, another of the records 512 depicted in the block 502 of FIG. 5A remains in an appended state such that the normalized key portion 536 is coupled to the payload data 538. Moreover, the payload data 538 itself may include a logical record portion 540 as well as a padded section 542 to account for a difference between the length DataLen (e.g., size) of the logical record and a length ChunkLen (e.g., storage capacity) of the overall payload. It should also be noted that the contents of the normalized key portions 522, 536 shown in FIGS. 5E, 5K may vary depending on the approach. For instance, in some approaches one or both of the normalized key portions 522, 536 may be padded.

Figure 5L:
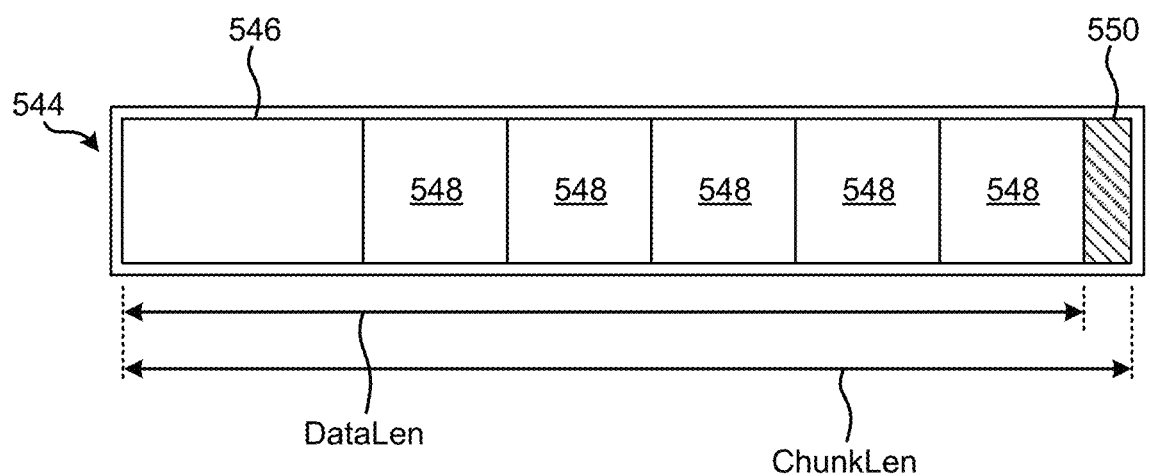

FIG. 5L further depicts the location in memory where the records which remain in an appended state are stored. Specifically, the record chunk 544 includes a chunk header 546 as well as a number of appended records 548 therein. Each of the appended records 548 further include a normalized key portion which is coupled to payload data, e.g., as shown in the appended record of FIG. 5K. As noted above, the decision to keep a normalized key portion appended to the corresponding payload data may be based on the size of the payload data itself. In other approaches, the decision on whether the payload data should remain appended to the key may be based on whether the record is of variable length. The record chunk 544 further includes a padded section 550 to compensate for the difference in the length DataLen (e.g., size) of the data in the record chunk 544 and the overall length ChunkLen (e.g., storage capacity) of the record chunk 544 itself.

It follows that various ones of the processes included herein are able to perform key extraction processing in a more efficient manner than has been conventionally achievable. These significant improvements result at least in part due to the reduction in data movement and data processing that is achieved by the various approaches included herein.

For instance, by reading and storing input data in a buffer, each record included therein may be evaluated. For a given record, the key included therein is sheared away from the corresponding payload data and stored in a target key-record area of memory. A determination is made as to whether the payload data itself is sufficiently large (e.g., includes a sufficiently large amount of data) to warrant the key remaining sheared from the payload data during processing. As noted above, this allows for computing overhead to be reduced and efficiency of the system as a whole to increase.

However, other factors may be considered in determining whether the payload data should remain sheared from the key, e.g., such as whether the key should be transformed, whether the record itself has a variable length, etc. Performing data processing like data sort operations is a CPU intensive process, thereby making the improvements that are achieved by some of the approaches herein even more significant.

It should also be noted that these improvements are achieved without creating any new keys or additional metadata aside from the data locator that is utilized in some approaches. Even in such approaches, the data locator may be as small as 8 bytes, thereby minimizing data storage usage.

As alluded to above, one or more of the operations included in the various embodiments herein (e.g., see method 460 above) may be performed by a controller at a cloud processing location that is coupled (e.g., via a network connection) to a storage system having internal memory as well as an external physical storage location that is removed from the storage system. Accordingly, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
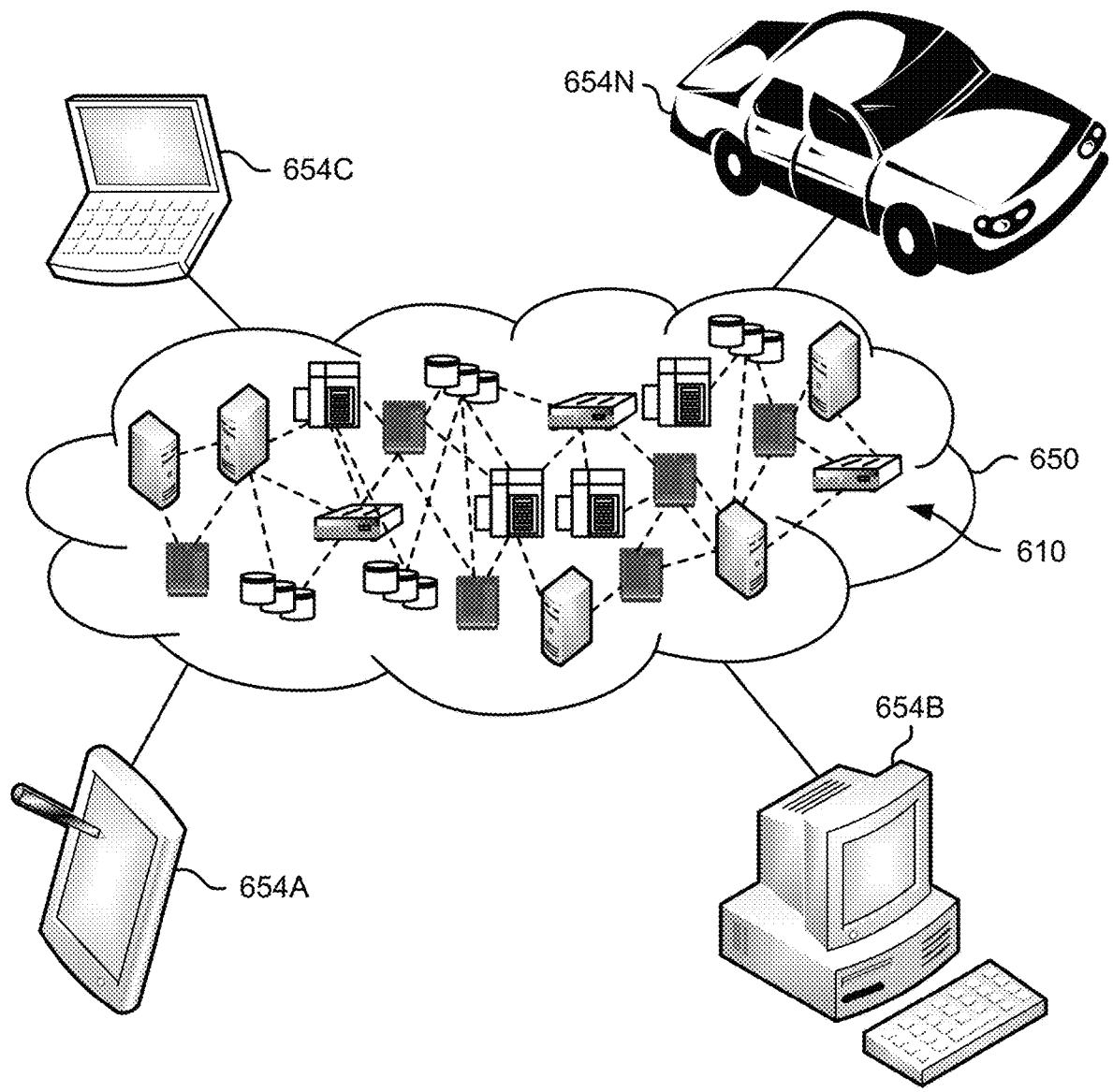
FIG. 6 depicts a cloud computing environment in accordance with one embodiment of the present invention.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-654N shown in FIG. 6 are intended to be illustrative only and that computing nodes 610 and cloud computing environment 650 can communicate with any type of computerized device over any type of network and/or network addressable connection (e.g., using a web browser).

Figure 7:
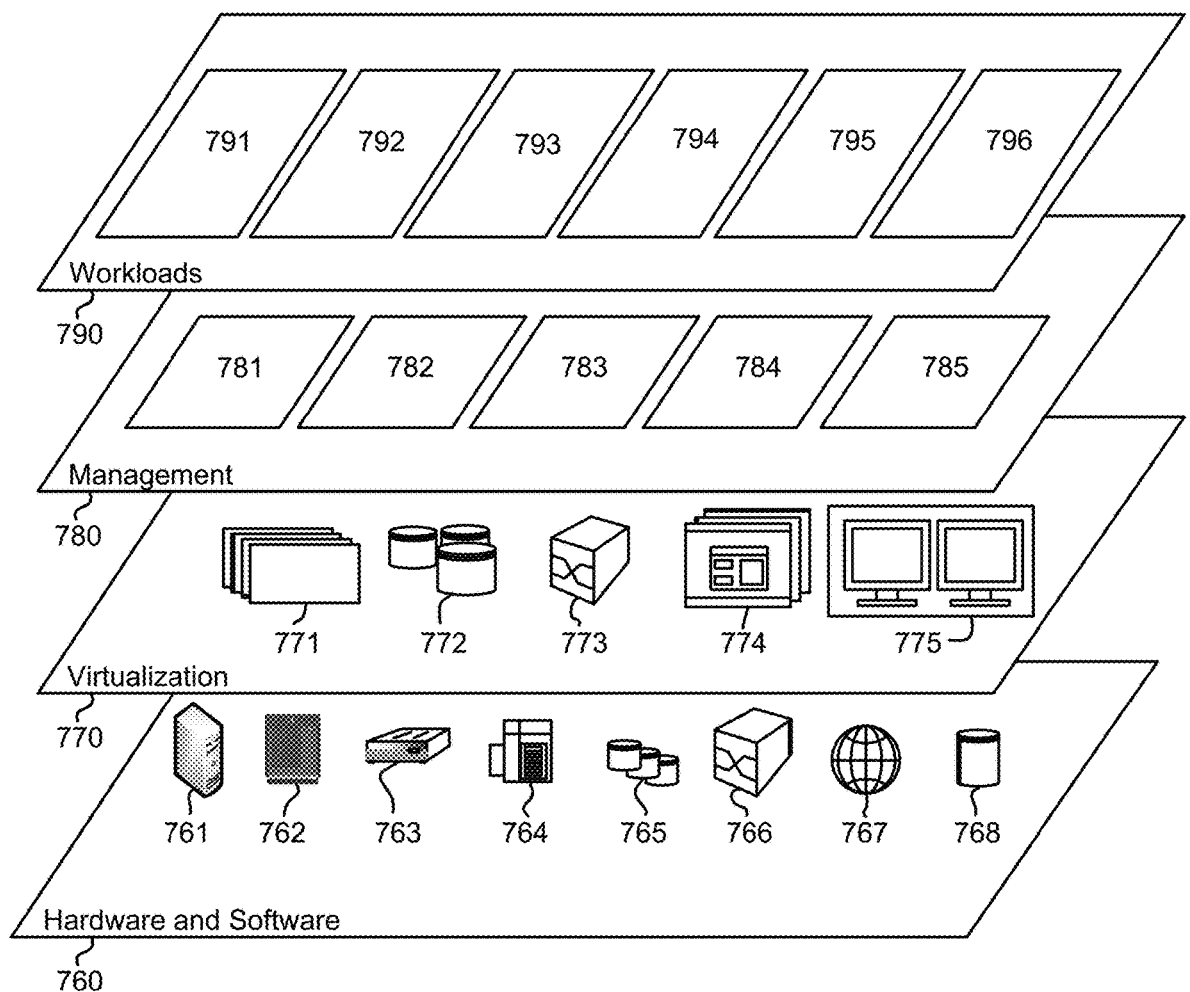
FIG. 7 depicts abstraction model layers in accordance with one embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; as well as selecting and evicting data in system memory to external physical storage 796.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A computer-implemented method, comprising:
processing records in an input data buffer by performing the following operations on each of the records, wherein each of the records include a key which is appended to payload data in the respective record:
causing the key associated with the record to be sheared from the payload data in the record,
causing the sheared key to be normalized,
causing the normalized sheared key to be stored in a first target area of memory,
determining whether a size of the payload data in the record is outside a first predetermined range,
in response to determining that the size of the payload data in the record is outside the first predetermined range, causing the payload data to be stored in a second target area of memory, and
causing a data locator to be appended to the normalized sheared key in the first target area of memory to form a sheared record, wherein the data locator corresponds to a storage location of the payload data in the second target area of memory;
in response to determining that a storage capacity of the memory is outside a second predetermined range, causing at least some of the payload data to be transferred to external physical storage; and
causing an external list to be integrated with each of the data locators that correspond to the transferred payload data, wherein the external list corresponds to a storage location of the transferred payload data in the external physical storage.

2. The computer-implemented method of claim 1, comprising:
in response to determining that the size of the payload data in the record is not outside the first predetermined range, causing the normalized sheared key to be combined with the corresponding payload data to form an appended record; and
integrating the appended record to be sorted in the first target area of memory.

3. The computer-implemented method of claim 2, wherein causing at least some of the payload data to be transferred to external physical storage includes:
selecting payload data and the corresponding normalized sheared key from one or more of the sheared records;
causing the selected payload data and the selected normalized sheared keys to be sent to the external physical storage; and
causing the selected payload data and the selected normalized sheared keys to be stored in the external physical storage.

4. The computer-implemented method of claim 3, wherein causing the selected payload data and the selected normalized sheared keys to be sent to the external physical storage includes:
causing the selected payload data to be sent to the external physical storage; and
causing the selected normalized sheared keys to be sent the external physical storage in response to the selected payload data being sent to the external physical storage.

5. The computer-implemented method of claim 1, comprising:
receiving a request for payload data in the external physical storage;
using one or more of the external lists to determine the storage location of the requested payload data in the external physical storage;

sending one or more instructions to retrieve the requested payload data from the storage location in the external physical storage;

causing the requested payload data to be stored in the second target area of memory; and causing the data locator corresponding to the requested payload data to be updated such that the data locator corresponds to a storage location of the requested payload data in the second target area of memory.

6. The computer-implemented method of claim 5, wherein updating the data locator corresponding to the requested payload data includes removing the external list from the data locator.

7. The computer-implemented method of claim 1, wherein causing a data locator to be appended to the normalized sheared key in the first target area of memory to form a sheared record includes:

determining whether the record is a variable length record;

in response to determining that the record is a variable length record, causing an offset value and a length to be implemented in the data locator appended to the normalized sheared key; and in response to determining that the record is not a variable length record, causing a pointer to be used as the data locator appended to the normalized sheared key.

8. The computer-implemented method of claim 1, comprising:

causing a sorting operation to be performed on the sheared records in the first target area of memory.

9. The computer-implemented method of claim 1, comprising:

in response to determining that the size of the payload data in the record is not outside the first predetermined range, causing the normalized sheared key to be combined with the corresponding payload data to form an appended record, combining the appended record to be stored in the first target area of memory, and causing a sorting operation to be performed on the appended records in the first target area of memory.

10. A computer program product, the computer program product comprising a computer readable storage medium having program instructions embodied therewith, the program instructions readable and/or executable by a processor to cause the processor to:

process, by the processor, records in an input data buffer by performing the following operations on each of the records, wherein each of the records include a key which is appended to payload data in the respective record:

cause, by the processor, the key associated with the record to be sheared from the payload data in the record, cause, by the processor, the sheared key to be normalized, cause, by the processor, the normalized sheared key to be stored in a first target area of memory, determine, by the processor, whether a size of the payload data in the record is outside a first predetermined range, in response to determining that the size of the payload data in the record is outside the first predetermined range, cause, by the processor, the payload data to be stored in a second target area of memory, and cause, by the processor, a data locator to be appended to the normalized sheared key in the first target area of memory to form a sheared record, wherein the data locator corresponds to a storage location of the payload data in the second target area of memory;

in response to determining that a storage capacity of the memory is outside a second predetermined range, cause, by the processor, at least some of the payload data to be transferred to external physical storage; and cause, by the processor, an external list to be integrated with each of the data locators that correspond to the transferred payload data, wherein the external list corresponds to a storage location of the transferred payload data in the external physical storage.

11. The computer program product of claim 10, wherein the program instructions are readable and/or executable by the processor to cause the processor to:

in response to determining that the size of the payload data in the record is not outside the first predetermined range, cause, by the processor, the normalized sheared key to be combined with the corresponding payload data to form an appended record; and integrate, by the processor, the appended record to be sorted in the first target area of memory.

12. The computer program product of claim 11, wherein causing at least some of the payload data to be transferred to external physical storage includes:

selecting payload data and the corresponding normalized sheared key from one or more of the sheared records;

causing the selected payload data and the selected normalized sheared keys to be sent to the external physical storage; and causing the selected payload data and the selected normalized sheared keys to be stored in the external physical storage.

13. The computer program product of claim 12, wherein causing the selected payload data and the selected normalized sheared keys to be sent to the external physical storage includes:

causing the selected payload data to be sent to the external physical storage; and causing the selected normalized sheared keys to be sent the external physical storage in response to the selected payload data being sent to the external physical storage.

14. The computer program product of claim 10, wherein the program instructions are readable and/or executable by the processor to cause the processor to:

receive, by the processor, a request for payload data in the external physical storage;

use, by the processor, one or more of the external lists to determine the storage location of the requested payload data in the external physical storage;

send, by the processor, one or more instructions to retrieve the requested payload data from the storage location in the external physical storage;

cause, by the processor, the requested payload data to be stored in the second target area of memory; and cause, by the processor, the data locator corresponding to the requested payload data to be updated such that the data locator corresponds to a storage location of the requested payload data in the second target area of memory.

15. The computer program product of claim 14, wherein updating the data locator corresponding to the requested payload data includes removing the external list from the data locator.

16. The computer program product of claim 10, wherein causing a data locator to be appended to the normalized sheared key in the first target area of memory to form a sheared record includes:
  determining whether the record is a variable length record;
  in response to determining that the record is a variable length record, causing an offset value and a length to be implemented in the data locator appended to the normalized sheared key; and
  in response to determining that the record is not a variable length record, causing a pointer to be used as the data locator appended to the normalized sheared key.

17. The computer program product of claim 10, wherein the program instructions are readable and/or executable by the processor to cause the processor to:
  in response to determining that the size of the payload data in the record is not outside the first predetermined range, cause, by the processor, the normalized sheared key to be combined with the corresponding payload data to form an appended record,
  combine, by the processor, the appended record to be stored in the first target area of memory, and
  cause, by the processor, a sorting operation to be performed on the appended records in the first target area of memory.

18. A system, comprising:
  a processor; and
  logic integrated with the processor, executable by the processor, or integrated with and executable by the processor, the logic being configured to:
  process, by the processor, records in an input data buffer by performing the following operations on each of the records, wherein each of the records include a key which is appended to payload data in the respective record:
    cause, by the processor, the key associated with the record to be sheared from the payload data in the record,
    cause, by the processor, the sheared key to be normalized,
    cause, by the processor, the normalized sheared key to be stored in a first target area of memory,
    determine, by the processor, whether a size of the payload data in the record is outside a first predetermined range,
    in response to determining that the size of the payload data in the record is outside the first predetermined range, cause, by the processor, the payload data to be stored in a second target area of memory, and
    cause, by the processor, a data locator to be appended to the normalized sheared key in the first target area of memory to form a sheared record, wherein the data locator corresponds to a storage location of the payload data in the second target area of memory;
  in response to determining that a storage capacity of the memory is outside a second predetermined range, cause, by the processor, at least some of the payload data to be transferred to external physical storage; and
  cause, by the processor, an external list to be integrated with each of the data locators that correspond to the transferred payload data, wherein the external list corresponds to a storage location of the transferred payload data in the external physical storage.

19. The system of claim 18, wherein the logic is configured to:
  receive, by the processor, a request for payload data in the external physical storage;
  use, by the processor, one or more of the external lists to determine the storage location of the requested payload data in the external physical storage;
  send, by the processor, one or more instructions to retrieve the requested payload data from the storage location in the external physical storage;
  cause, by the processor, the requested payload data to be stored in the second target area of memory; and
  cause, by the processor, the data locator corresponding to the requested payload data to be updated such that the data locator corresponds to a storage location of the requested payload data in the second target area of memory.

20. The system of claim 19, wherein updating the data locator corresponding to the requested payload data includes removing the external list from the data locator.

* * * * *